United States Patent
Kunita

(10) Patent No.: US 7,906,582 B2
(45) Date of Patent: Mar. 15, 2011

(54) POLYMERIZABLE COMPOSITION, TACKY MATERIAL, AND ADHESIVE

(75) Inventor: Kazuto Kunita, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 63 days.

(21) Appl. No.: 12/027,733

(22) Filed: Feb. 7, 2008

(65) Prior Publication Data

US 2008/0199691 A1    Aug. 21, 2008

(30) Foreign Application Priority Data

Feb. 20, 2007 (JP) ................. 2007-039417

(51) Int. Cl.
| | |
|---|---|
| C08L 31/04 | (2006.01) |
| C08L 31/06 | (2006.01) |
| C08L 33/20 | (2006.01) |
| C08L 33/08 | (2006.01) |
| C08L 33/10 | (2006.01) |

(52) U.S. Cl. .......................... 525/80; 525/81
(58) Field of Classification Search ............... 525/80, 525/81
See application file for complete search history.

(56) References Cited

U.S. PATENT DOCUMENTS

| | | | | |
|---|---|---|---|---|
| 3,964,955 A | * | 6/1976 | Hirooka et al. ............... | 156/332 |
| 5,683,536 A | * | 11/1997 | Kneafsey ...................... | 156/327 |
| 6,716,565 B2 | | 4/2004 | Kunita et al. ............... | 430/270.1 |
| 6,787,622 B2 | * | 9/2004 | Kunita .......................... | 526/257 |
| 6,818,372 B2 | * | 11/2004 | Kunita et al. ................. | 430/138 |
| 6,858,373 B2 | * | 2/2005 | Kunita ......................... | 430/281.1 |

FOREIGN PATENT DOCUMENTS

| | | |
|---|---|---|
| JP | 60-196956 A | 10/1985 |
| JP | 60-201642 A | 10/1985 |
| JP | 61-028572 A | 2/1986 |
| JP | 62-010180 A | 1/1987 |
| JP | 62-016543 A | 1/1987 |
| JP | 05-214299 A | 8/1993 |
| JP | 09-008109 A | 1/1997 |
| JP | 2002069110 A | * 3/2002 |

OTHER PUBLICATIONS

Machine Translation of Kunida JP 2002-069110 A.*
Machine Translation of Aogaki et al JP 09-008109 A.*
Machine Translation of Kunida KP 2002-069110 A. Year: 2002.*
Machine Translation of Aogaki JP 09-008109 A. Year: 1997.*

* cited by examiner

Primary Examiner — Randy Gulakowski
Assistant Examiner — Mike Dollinger
(74) Attorney, Agent, or Firm — Sughrue Mion, PLLC

(57) ABSTRACT

A polymerizable composition is provided that includes a compound represented by Formula (I), a macromolecule having a monomer unit represented by Formula (II) and/or another addition-polymerization type macromolecule, and a macromolecular filler.

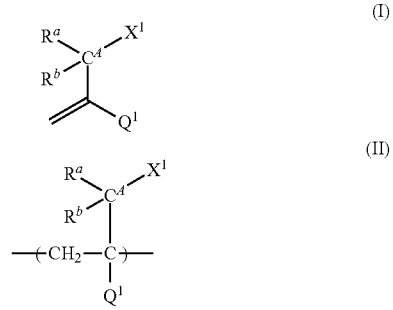

In Formula (I) and (II), $Q^1$ denotes a cyano group or a $-COX^2$ group, $X^1$ denotes a hydrogen atom, organic residue, or polymer chain bonded to carbon atom $C^A$ via a heteroatom, or a halogen atom, $X^2$ denotes a hydrogen atom, organic residue, or polymer chain bonded to the carbonyl group via a heteroatom, or a halogen atom, $R^a$ and $R^b$ independently denote a hydrogen atom, a halogen atom, a cyano group, or an organic residue, and $X^1$ and $X^2$, $R^a$ and $R^b$, and $X^1$ and $R^a$ or $R^b$ may be bonded to each other to form a cyclic structure. There are also provided a tacky material produced by forming on a support a 10 to 200 μm layer that includes the polymerizable composition, and an adhesive that includes the polymerizable composition.

6 Claims, No Drawings

POLYMERIZABLE COMPOSITION, TACKY MATERIAL, AND ADHESIVE

BACKGROUND OF THE INVENTION

1. Field of the Invention

The present invention relates to a polymerizable composition, a tacky material, and an adhesive.

2. Description of the Related Art

Conventionally, emulsion type, solvent-based, and hotmelt type pressure-sensitive adhesives have been used. However, it takes a long time to dry the water or solvent of these adhesives. Furthermore, since a high temperature is required when carrying out coating, the cost of a production line is high. Moreover, in the case of solvent-based pressure-sensitive adhesives, since a solvent such as toluene is released during a drying step, there is a serious problem in terms of environmental pollution.

As means for improving these defects, there have been developed a radiation-curing pressure-sensitive adhesive tape comprising a support that transmits radiation, for example, light such as UV rays or ionizing radiation such as an electron beam, and a pressure-sensitive adhesive layer applied on the support and having the property of curing upon exposure to radiation, and a UV-curing pressure-sensitive adhesive (JP-A-5-214299 and JP-A-9-8109; JP-A denotes a Japanese unexamined patent application publication).

The radiation-curing pressure-sensitive adhesive tape has, for example, a high tack strength toward a semiconductor wafer during a dicing process, whereas after the semiconductor wafer is cut into chips, by applying radiation from the substrate side so as to cure the pressure-sensitive adhesive layer, the fixation tack strength to the chip is greatly reduced. This radiation-curing pressure-sensitive adhesive tape is proposed as one that enables the chips to be easily picked up regardless of the size of the chip, for example, a large chip of 25 mm$^2$ or greater.

These proposals are based on the principle that the flowability of the radiation-curing pressure-sensitive adhesive is greatly decreased by curing by irradiating with radiation a radiation-polymerizable compound contained in the pressure-sensitive adhesive applied on the radiation-transmitting support, to thus impart a three-dimensional network structure to the pressure-sensitive adhesive (JP-A-60-196956, JP-A-60-201642, JP-A-61-28572, and JP-A-62-10180).

Furthermore, as a film for semiconductor chip dicing that reduces in tack strength after a tape is stretched, without using a radiation-polymerizable compound, there is proposed a pressure-sensitive adhesive tape for fixing a semiconductor wafer that is formed by adding an organic or inorganic filler to a pressure-sensitive adhesive of a pressure-sensitive adhesive layer and for which picking up is made easy by stretching the tape so as to make the filler protrude from the surface of the pressure-sensitive adhesive layer after cutting the semiconductor wafer into chips (JP-A-62-16543).

In recent years, in order to simplify the production process for a semiconductor chip, a method is used in which, after a semiconductor wafer is cut into chips, semiconductor chips are picked up without stretching the tape. In this case, a tape of a type that makes picking up easy by stretching rather than by radiation curing of a pressure-sensitive adhesive as proposed in JP-A-62-16543 cannot be applied since it aims to improve picking up by stretching.

On the other hand, in the case of a radiation-curing tape, since it can be designed as a type that does not require a stretching step, it is very useful for the above-mentioned purpose of simplifying the production process for semiconductor chips. However, even in such a radiation-curing tape, if a chip obtained after cutting a semiconductor wafer is of a large size such as one exceeding 100 mm$^2$, the decrease in tack strength is not sufficient and the chip cannot be picked up, which is a new problem.

A conventional tacky material is a simple mixture of an acrylic copolymer and an acrylic monomer or a mixture of an acrylic oligomer and an acrylic monomer. However, compared with emulsion type, solvent-based, etc. pressure-sensitive adhesives, the conventional ones all have a poor balance between cured coating surface tack, cured coating cohesive strength, and adhesive strength. Because of this, the function as a pressure-sensitive adhesive is very poor.

As described above, in the field of radiation-curing pressure-sensitive adhesive tapes and UV-curing pressure-sensitive adhesives, a balance between cured coating surface tack, cured coating cohesive strength, and adhesive strength is required, but this has not yet been solved.

BRIEF SUMMARY OF THE INVENTION

It is an object of the present invention to provide a polymerizable composition with high sensitivity, high discrimination, and high stability, and a tacky material comprising the polymerizable composition.

It is another object of the present invention to provide a polymerizable composition with high adhesive strength, high sensitivity, and high stability, and an adhesive comprising the polymerizable composition.

These objects have been attained by means described below.

(1) A polymerizable composition comprising: a compound represented by Formula (I); a macromolecule having a monomer unit represented by Formula (II) and/or another addition-polymerization type macromolecule; and a macromolecular filler,

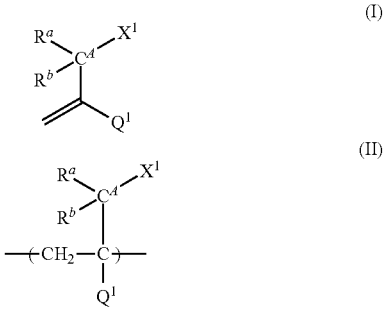

in Formula (I) and (II), $Q^1$ denotes a cyano group or a —$COX^2$ group, $X^1$ denotes a hydrogen atom, organic residue, or polymer chain bonded to carbon atom $C^A$ via a heteroatom, or a halogen atom, $X^2$ denotes a hydrogen atom, organic residue, or polymer chain bonded to the carbonyl group via a heteroatom, or a halogen atom, $R^a$ and $R^b$ independently denote a hydrogen atom, a halogen atom, a cyano group, or an organic residue, and $X^1$ and $X^2$, $R^a$ and $R^b$, and $X^1$ and $R^a$ or $R^b$ may be bonded to each other to form a cyclic structure.

(2) The polymerizable composition according to (1), wherein the hetero atom of $X^1$ is an oxygen atom or a nitrogen atom.

(3) The polymerizable composition according to (1), wherein $X^1$ is an organic residue or polymer chain having at least one group or bond selected from the group consisting of a hydroxy group, an ether bond, an ester bond, a urethane bond, and an amide bond.

(4) The polymerizable composition according to (1), wherein $Q^1$ is a —$COX^2$ group.

(5) The polymerizable composition according to (1), wherein $X^1$ and/or $X^2$ have a substituent containing an alicyclic structure or aromatic ring.

(6) The polymerizable composition according to (1), wherein the macromolecular filler is at least one macromolecular filler selected from the group consisting of a rubber, an acrylic-olefin copolymer, a polyurethane resin, a polyester resin, a polyvinylacetal resin, a xylene resin, a styrene resin, an acrylic resin, an epoxy resin, and a phenol resin.

(7) The polymerizable composition according to (6), wherein the macromolecular fillers are used in a combination of two or more types.

(8) A tacky material produced by forming on a support a 10 to 200 μm thick layer comprising the polymerizable composition according to (1).

(9) The tacky material according to (8), wherein the polymerizable composition comprises a polymethyl methacrylate and/or polyurethane resin macromolecular filler.

(10) The tacky material according to (8), wherein the polymerizable composition comprises a polyfunctional isocyanurate.

(11) An adhesive comprising the polymerizable composition according to (1).

(12) The adhesive according to (11), wherein the polymerizable composition comprises at least one macromolecular filler selected from the group consisting of a xylene resin, an acrylic rubber, and a polyvinylacetal resin.

DETAILED DESCRIPTION OF THE INVENTION (1) Polymerizable Composition

A polymerizable composition of the present invention comprising: a compound represented by Formula (I); a macromolecule having a monomer unit represented by Formula (II) and/or another addition-polymerization type macromolecule; and a macromolecular filler.

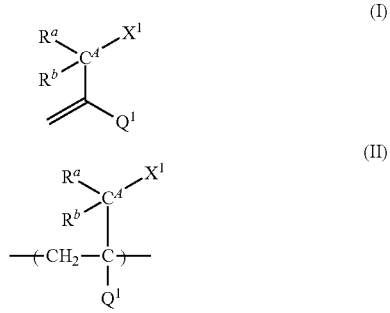

in Formula (I) and (II), $Q^1$ denotes a cyano group or a —$COX^2$ group, $X^1$ denotes a hydrogen atom, organic residue, or polymer chain bonded, to carbon atom $C^A$ via a heteroatom, or a halogen atom, $X^2$ denotes a hydrogen atom, organic residue, or polymer chain bonded to the carbonyl group via a heteroatom, or a halogen atom, $R^a$ and $R^b$ independently denote a hydrogen atom, a halogen atom, a cyano group, or an organic residue, and $X^1$ and $X^2$, $R^a$ and $R^b$, and $X^1$ and $R^a$ or $R^b$ may be bonded to each other to form a cyclic structure.

The compound represented by Formula (I) is explained below.

in Formula (I), $Q^1$ denotes a cyano group or a —$COX^2$ group, $X^1$ denotes a hydrogen atom, organic residue, or polymer chain bonded to carbon atom $C^A$ via a heteroatom, or a halogen atom, $X^2$ denotes a hydrogen atom, organic residue, or polymer chain bonded to the carbonyl group via a heteroatom, or a halogen atom, $R^a$ and $R^b$ independently denote a hydrogen atom, a halogen atom, a cyano group, or an organic residue, and $X^1$ and $X^2$, $R^a$ and $R^b$, and $X^1$ and $R^a$ or $R^b$ may be bonded to each other to form a cyclic structure.

In the present invention, the compound represented by Formula (I) has at least one ethylenically unsaturated group in which two substituents are bonded to one of the carbon atoms forming the ethylenically unsaturated double bond.

$X^1$ denotes a hydrogen atom, organic residue, or polymer chain that is bonded via a heteroatom to carbon atom $C^A$ in Formula (I). When $Q^1$ is —$COX^2$, $X^2$ denotes a hydrogen atom, organic residue, or polymer chain that is bonded to the carbonyl group via a heteroatom, or a halogen atom. The carbon atom $C^A$ is a carbon atom which is adjacent to the ethylenically unsaturated bond and $R^a$, $R^b$, and $X^1$ are bonded to.

$X^1$ and $X^2$ may be monovalent organic residues, the $X^1$s or $X^2$s may be linked together via a divalent or n-valent organic linking group to give a difunctional or n-functional type ($n \geq 3$; n denotes an integer of 3 or greater), or they may give a polymer type by forming a monomer unit residue in an oligomer or polymer.

Typical compound groups i) to iv) represented by Formula (I) are explained below.

The compound represented by Formula (I) is i) a monofunctional type ethylenically unsaturated compound (compound examples A-1 to A-42), listed later, when $Q^1$ denotes —$COX^2$ and $X^1$ and $X^2$ are hydrogen atoms or monovalent organic residues bonded to carbon atom $C^A$ or the carbonyl group via a heteroatom, or halogen atoms, and is a monofunctional type ethylenically unsaturated compound having a cyclic structure (compound examples B-1 to B-9) when $X^1$ and $X^2$, $R^a$ and $R^b$, or $X^1$ and $R^a$ or $R^b$ are bonded to each other to form a cyclic structure.

The compound represented by Formula (I) is ii) a difunctional type ethylenically unsaturated compound (compound examples C-1 to C-14) when $Q^1$ denotes —$COX^2$ and $X^1$ is a hydrogen atom or monovalent organic residue bonded to carbon atom $C^A$ via a heteroatom, or a halogen atom, and $X^2$ is a divalent group bonded to two carbonyl groups via a heteroatom, and is also a difunctional type ethylenically unsaturated compound (compound examples D-1 to D-30) when $X^1$ is a divalent organic residue bonded to two carbon atoms A via a heteroatom and $X^2$ is a hydrogen atom, a monovalent organic residue, or a halogen atom.

The compound represented by Formula (I) is iii) an n-functional type ethylenically unsaturated compound having three or more functional groups (compound examples E-1 to E-22) when $X^1$ is a monovalent group, $Q^1$ denotes —$COX^2$, and $X^2$ is an n-valent organic residue ($n \geq 3$), and is also an n-functional type ethylenically unsaturated compound (compound examples F-1 to F-10) when $X^1$ is an n-valent organic residue ($n \geq 3$; n denotes an integer of 3 or greater) and $X^2$ is a hydrogen atom, a monovalent organic residue, or a halogen atom.

Furthermore, the compound represented by Formula (I) is iv) a polymer type ethylenically unsaturated compound (compound examples G-1 to G-15) when $X^1$ or $Q^1$ denote $-COX^2$, and either one of the $X^1$ and $X^2$, and preferably $X^2$, is a monomer unit residue of an oligomer or a polymer formed by addition polymerization or addition copolymerization.

With regard to the compound represented by Formula (I), when $Q^1$ denotes a cyano group, as in the case in which $Q^1$ is $COX^2$, it can be i) a monofunctional type, ii) a difunctional type, iii) a polyfunctional type, and iv) a polymer type compound, which are listed later (compound examples H-1 to H-8).

When $Q^1$ denotes $-COX^2$ or $-CN$, a person skilled in the art can of course produce a large number of compound variations in addition to the above-mentioned four compound groups.

In the above-mentioned polymer type ethylenically unsaturated compounds, at least one of $X^1$ and $X^2$ is bonded to a main chain of a polymer. That is, a configuration is employed in which a structure derived from Formula (I) is present in a side chain of a polymer chain. Examples of the polymer include the following linear organic macromolecular polymers.

That is, examples include polyurethane, novolac, vinyl-based polymers such as polyvinyl alcohol, polyhydroxystyrene, polystyrene, poly(meth)acrylic acid ester, and poly(meth)acrylamide, and polyacetal. These polymers may be homopolymers or copolymers.

In Formula (I) $Q^1$ is a cyano group or a $-COX^2$ group, and in $X^1$ or $X^2$ the heteroatom bonded to carbon atom $C^A$ or the carbonyl group and to the organic residue, etc. means an atom other than carbon, and preferably a non-metallic atom; specific examples thereof include an oxygen atom, a sulfur atom, a nitrogen atom, and a phosphorus atom, an oxygen atom, a sulfur atom, and a nitrogen atom are preferable, and an oxygen atom and a nitrogen atom are more preferable.

$X^1$ and/or $X^2$ preferably is substituted by a substituent having an alicyclic structure or an aromatic ring.

When $X^1$ or $X^2$ is a halogen atom, examples thereof include a chlorine atom, a bromine atom, an iodine atom, a fluorine atom, etc., and a chlorine atom and a bromine atom are preferable.

$X^1$ is preferably a group selected from the group consisting of a hydroxy group, a substituted oxy group, a mercapto group, a substituted thio group, an amino group, a substituted amino group, a sulfo group, a substituted sulfo group, a sulfonato group, a substituted sulfinyl group, a substituted sulfonyl group, a phosphono group, a substituted phosphono group, a phosphonato group, a substituted phosphonato group, a nitro group, and a heterocyclic group (provided that it is linked to carbon atom $C^A$ via a heteroatom in the heterocycle), or a polymer chain bonded to carbon atom $C^A$ via an oxygen atom, a nitrogen atom, a sulfur atom, or a phosphorus atom, and is more preferably a hydroxy group, or an organic residue or polymer chain having a bond selected from the group consisting of an ether bond, a carboxylic acid ester bond, an urethane bond, and an amino bond.

$X^2$ is preferably a hydrogen atom, organic residue, or polymer chain bonded to the carbonyl group via a heteroatom, and preferred examples thereof include a hydroxy group, a substituted oxy group, a mercapto group, a substituted thio group, an amino group, a substituted amino group, a heterocyclic group (provided that it is linked to the carbonyl group via a heteroatom in the heterocycle), and a polymer chain bonded to the carbonyl group via a heteroatom.

$R^a$ and $R^b$ independently denote a hydrogen atom, a halogen atom, a cyano group, or an organic residue, and the organic residue is preferably a hydrocarbon group, a substituted oxy group, a substituted thio group, a substituted amino group, a substituted carbonyl group, or a carboxylate group that may have a substituent and may contain an unsaturated bond. Furthermore, $R^a$ and $R^b$ may be bonded to each other to form a cyclic structure.

Examples of substituents allowed for $X^1$, $X^2$, $R^a$, and $R^b$ in Formula (I) are now shown. These substituents include a hydrocarbon group that may have a further substituent and may contain an unsaturated bond, an acyl group, and a heterocyclic group.

Examples of the hydrocarbon group that may have a substituent and may contain an unsaturated bond include an alkyl group, a substituted alkyl group, an aryl group, a substituted aryl group, an alkenyl group, a substituted alkenyl group, an alkynyl group, and a substituted alkynyl group.

Examples of the acyl group include an alkylcarbonyl group, an arylcarbonyl group, an alkylsulfonyl group, and an arylsulfonyl group.

Examples of the heterocyclic group include five-or six-membered heterocyclic groups containing a nitrogen atom, an oxygen atom, or a sulfur atom as a heteroatom, and a group in which the above heterocyclic group is fused with an aromatic group.

Examples of the alkyl group include straight-chain, branched, or cyclic alkyl groups having 1 to 20 carbon atoms, and specific examples thereof include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, an s-butyl group, a t-butyl group, an isopentyl group, a neopentyl group, a 1-methylbutyl group, an isohexyl group, a 2-ethylhexyl group, a 2-methylhexyl group, a cyclohexyl group, a cyclopentyl group, and a 2-norbornyl group. Among them, a straight-chain alkyl group having 1 to 12 carbon atoms, a branched alkyl group having 3 to 12 carbon atoms, and a cyclic alkyl group having 5 to 10 carbon atoms are more preferable.

The substituted alkyl group is a group formed by bonding between a substituent and an alkylene group; examples of the substituent include a monovalent non-metallic atom (atomic group) other than hydrogen, and any atom or group that does not inhibit polymerization of a compound represented by Formula (I) is allowed. The substituted alkenyl group, the substituted alkynyl group, and the substituted aryl group can be defined in the same manner. Among these groups, preferred examples of the substituent include a halogen atom (—F, —Br, —Cl, —I), a hydroxy group, an alkoxy group, an aryloxy group, an acyloxy group, a cyano group, an alkyl group, and an aryl group. Other allowable substituents are described in paragraphs 0017 to 0041 of JP-A-2001-92127.

Preferred examples of the aryl group include an aromatic group having 6 to 20 carbon atoms, a fused ring formed from 2 or 3 benzene rings, and a fused ring formed from a benzene ring and a 5-membered unsaturated ring. Specific examples thereof include a phenyl group, a naphthyl group, an anthryl group, a phenanthryl group, an indenyl group, an acenaphthenyl group, and a fluorenyl group, and among them a phenyl group and a naphthyl group are preferable.

As the alkenyl group, a group having 2 to 20 carbon atoms is preferable. The substituted alkenyl group is a group in which a hydrogen atom of the alkenyl group is replaced by a substituent bonded to the group, and as this substituent a substituent described above for the substituted alkyl group may be used.

The alkynyl group preferably has 2 to 20 carbon atoms. The substituted alkynyl group is a group in which a hydrogen atom of an alkynyl group is replaced by a substituent bonded to the group, and as this substituent a substituent described above for the substituted alkyl group may be used.

Examples of the cyclic structure formed by bonding between $X^1$ and $X^2$, $R^a$ and $R^b$, or $X^1$ and $R^a$ or $R^b$ are now shown. Preferred examples of an aliphatic ring formed by bonding between $X^1$ and $X^2$, $R^a$ and $R^b$, or $X^1$ and $R^a$ or $R^b$ include 4-membered, 5-membered, 6-membered, 7-membered, and 8-membered aliphatic rings, and more preferred examples thereof include 4-membered, 5-membered, and 6-membered aliphatic rings. They may further have a substituent on a carbon atom forming these rings (examples of the substituent include substituents allowed for the substituted alkyl group described above), and some of the ring-forming carbon atoms may be replaced by a heteroatom (oxygen atom, sulfur atom, nitrogen atom, etc.). Furthermore, part of the aliphatic ring may form part of an aromatic ring.

$X^1$ and/or $X^2$ is preferably substituted by a substituent selected from the group consisting of an alkyl group having 4 to 12 carbon atoms (including a cycloalkyl group as a preferable alicyclic structure), a substituted alkyl group having 4 to 20 carbon atoms, an aryl group having 6 to 12 carbon atoms, a substituted aryl group having 6 to 20 carbon atoms, and a heterocyclic group having an oxygen atom, a nitrogen atom, or a sulfur atom as a heteroatom, and is more preferably substituted by a substituent selected from the group consisting of a cycloalkyl group having 4 to 12 carbon atoms, an aryl group, and a heterocyclic group. Examples of the cycloalkyl group include a cyclopentyl group, a cyclohexyl group, and a 2-norbornyl group. Examples of the aryl group include a phenyl group. Examples of the heterocyclic group include a morpholino group.

The compound represented by Formula (I) is preferably a; compound represented by Formula (I-A) to (I-F) below or a compound having a structural unit represented by Formula (I-G-1) to (I-G-4) below.

Among the compounds represented by Formula (I), as the monofunctional type compound i), compounds represented by Formula (I-A) or Formula (I-B) are preferable.

(I-A)

$X^3$ in Formula (I-A) denotes a hydrogen atom or monovalent organic residue bonded via a heteroatom, or a halogen atom, and $X^4$ denotes a monovalent organic residue bonded via a heteroatom.

$X^3$ in Formula (I-A) is preferably a hydrogen atom or monovalent organic residue bonded via an oxygen atom, a sulfur atom, or a nitrogen atom, or a halogen atom, is more preferably a hydroxy group, a heterocyclic group bonded via a heteroatom, a straight-chain or branched alkoxy group having 1 to 10 carbon atoms, a straight-chain or branched substituted alkoxy group having 1 to 15 carbon atoms, an acyloxy group having 1 to 10 carbon atoms, an aryloxy group having 6 to 12 carbon atoms, a substituted aryloxy group having 6 to 20 carbon atoms, or a substituted amino group, and is yet more preferably a hydroxy group, an acyloxy group having 1 to 10 carbon atoms, or a a substituted amino group. The acyloxy group having 1 to 10 carbon atoms is preferably an aroyloxy group, and more preferably a benzoyloxy group. The substituted amino group preferably has an aromatic ring.

$X^4$ in Formula (I-A) is preferably a monovalent organic residue bonded via an oxygen atom, is more preferably a hydroxy group, a straight-chain or branched alkoxy group having 1 to 12 carbon atoms, a straight-chain or branched substituted alkoxy group having 1 to 20 carbon atoms, a cycloalkyl group having 3 to 8 carbon atoms, an aryloxy group having 6 to 18 carbon atoms, or a substituted aryloxy group having 6 to 20 carbon atoms, and is yet more preferably a cycloalkyl group having 3 to 8 carbon atoms or an aryloxy group having 6 to 18 carbon atoms.

Preferred examples of the substituent in the substituted alkoxy group and substituted aryloxy group include a halogen atom (—F, —Br, —Cl, —I), a hydroxy group, an alkoxy group having 1 to 6 carbon atoms, an aryloxy group having 6 to 12 carbon atoms, an acyloxy group having 2 to 5 carbon atoms, a cyano group, a straight-chain or branched alkyl group having 1 to 8 carbon atoms, and an aryl group having 6 to 12 carbon atoms.

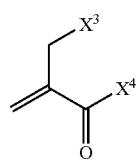

(I-B)

$Z^1$ in Formula (I-B) denotes a divalent linking group having at both ends a heteroatom such as an oxygen atom, a nitrogen atom, or a sulfur atom.

The ring containing $Z^1$ in Formula (I-B) is preferably an aliphatic ring, is more preferably a 4-membered, 5-membered, 6-membered, 7-membered, or 8-membered aliphatic ring, and is yet more preferably a 4-membered, 5-membered, or 6-membered aliphatic ring. Furthermore, some of the ring members may be replaced by a heteroatom (an oxygen atom, a sulfur atom, a nitrogen atom, etc.) other than a carbon atom. That is, the divalent linking group may have a heteroatom in addition to the heteroatoms at both ends. Furthermore, part of the aliphatic ring may form part of an aromatic ring.

Moreover, it may have a substituent on a carbon atom or heteroatom forming the ring. Examples of the substituent include an alkyl group having 1 to 6 carbon atoms, an aryl group having 6 to 12 carbon atoms, and an oxy group (=O).

Among the compounds represented by Formula (I), as the difunctional type compound ii), compounds represented by Formula (I-C) or Formula (I-D) are preferable.

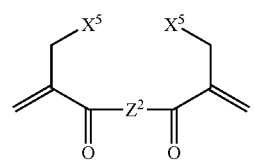

(I-C)

In Formula (I-C), the $X^5$s independently denote a hydrogen atom or monovalent organic residue bonded via an oxygen atom, and $Z^2$ denotes a divalent linking group having a heteroatom at both ends.

$X^5$ in Formula (I-C) is preferably a hydroxy group, a straight-chain or branched alkoxy group having 1 to 10 carbon atoms, a straight-chain or branched substituted alkoxy group having 1 to 10 carbon atoms, an acyloxy group having 2 to 10 carbon atoms, an aryloxy group having 6 to 12 carbon atoms, or a substituted aryloxy group having 6 to 20 carbon atoms, and is more preferably a hydroxy group, an alkoxy group having 1 to 5 carbon atoms, or a substituted alkoxy group having 1 to 5 carbon atoms.

Preferred examples of the substituent in the substituted alkoxy group and substituted aryloxy group include a halogen atom (—F, —Br, —Cl, —I), a hydroxy group, an alkoxy group having 1 to 5 carbon atoms, an aryloxy group having 6 to 12 carbon atoms, an acyloxy group having 2 to 5 carbon atoms, a cyano group, an alkyl group having 1 to 10 carbon atoms, and an aryl group having 6 to 12 carbon atoms.

In the present invention, $X^5$ is preferably a hydroxy group or a group having an aromatic ring, and is more preferably a hydroxy group or a benzyl group.

$Z^2$ in Formula (I-C) denotes a divalent linking group having a heteroatom at both ends; the heteroatom is preferably an oxygen atom, and the linking group is preferably an alkylene group, arylene group, or combination thereof bonded via a group or bond selected from the group consisting of a single bond, an ether bond, a thioether bond, a carboxylic acid ester bond, an amide bond, a urethane bond, and a sulfonyl group, and more preferably a group containing at least one aromatic ring. $Z^2$ is preferably a group formed only from hydrogen, carbon, and oxygen atoms.

Furthermore, $Z^2$ is preferably a group having no greater than 50 carbon atoms, more preferably having 2 to 50 carbon atoms, yet more preferably 6 to 44 carbon atoms, and particularly preferably 6 to 16 carbon atoms.

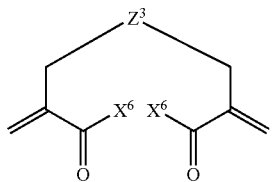

(I-D)

In Formula (I-D), the $X^6$s independently denote a monovalent organic residue bonded via a heteroatom, and $Z^3$ denotes a divalent linking group having a heteroatom at both ends.

$X^6$ in Formula (I-D) is preferably a monovalent organic residue bonded via an oxygen atom, is more preferably a straight-chain or branched alkoxy group having 1 to 10 carbon atoms, a straight-chain or branched substituted alkoxy group having 1 to 10 carbon atoms, an aryloxy group having 6 to 12 carbon atoms, or a substituted aryloxy group having 6 to 12 carbon atoms, and is yet more preferably an alkoxy group having 1 to 5 carbon atoms, or a substituted alkoxy group having 1 to 5 carbon atoms.

Preferred examples of the substituent in the substituted alkoxy group and substituted aryloxy group include a halogen atom (—F, —Br, —Cl, —I), a hydroxy group, an alkoxy group having 1 to 5 carbon atoms, an aryloxy group having 6 to 12 carbon atoms, an acyloxy group having 2 to 5 carbon atoms, a cyano group, an alkyl group having 1 to 5 carbon atoms, and an aryl group having 6 to 12 carbon atoms.

$Z^3$ in Formula (I-D) denotes a divalent linking group having a heteroatom at both ends; the heteroatom at both ends is preferably an oxygen atom, a nitrogen atom, or a sulfur atom, and the divalent linking group is preferably an alkylene group, arylene group, or combination thereof containing a group or a bond selected from the group consisting of a single bond, a thioether bond, a carboxylic acid ester bond, an amide bond, a urethane bond, and a sulfonato group (—OSO$_2$—), and more preferably a group containing at least one aromatic ring. Furthermore, $Z^3$ is preferably a group formed only from hydrogen, carbon, and oxygen atoms. Moreover, $Z^3$ is preferably a group having no greater than 50 carbon atoms, more preferably having 2 to 50 carbon atoms, yet more preferably 6 to 44 carbon atoms, and particularly preferably 6 to 16 carbon atoms.

Among the compounds represented by Formula (I), the polyfunctional type compound iii) is preferably a compound represented by Formula (I-E) or Formula (I-F) below.

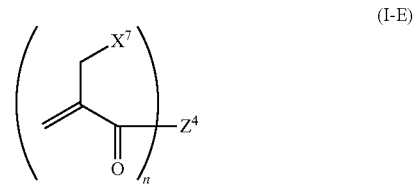

(I-E)

In Formula (I-E), the $X^7$s independently denote an hydrogen atom or monovalent organic residue bonded via an oxygen atom, or a halogen atom, $Z^4$ denotes a tri-or higher-valent linking group bonded to the carbonyl group via a heteroatom, and n denotes an integer of 3 or greater.

In Formula (I-E), the 3 or more $X^7$s may be identical to or different from each other, but it is preferable for them to be all the same.

The $X^7$s are independently preferably a hydrogen atom or monovalent organic residue bonded via an oxygen atom, a nitrogen atom, or a sulfur atom, or a halogen atom, are more preferably a hydroxy group, a straight-chain or branched alkoxy group having 1 to 10 carbon atoms, a straight-chain or branched substituted alkoxy group having 1 to 10 carbon atoms, an aryloxy group having 6 to 12 carbon atoms, a substituted aryloxy group having 6 to 12 carbon atoms, an acyloxy group having 2 to 10 carbon atoms, a substituted acyloxy group having 2 to 10 carbon atoms, or a heterocyclic group bonded via a hetero atom and yet more preferably a 3-to 8-membered heterocyclic group bonded via a hetero atom contained in the ring.

Preferred examples of the substituent in the substituted alkoxy group, the substituted aryloxy group, and the substituted acyloxy group include a halogen atom (—F, —Br, —Cl, —I), a hydroxy group, an alkoxy group having 1 to 5 carbon atoms, an aryloxy group having 6 to 12 carbon atoms, an acyloxy group having 2 to 5 carbon atoms, a cyano group, a straight-chain or branched alkyl group having 1 to 5 carbon atoms, and an aryl group having 6 to 12 carbon atoms.

It is preferable for n in Formula (I-E) to be an integer of 3 to 10, and more preferably an integer of 3 to 6.

$Z^4$ in Formula (I-E) is preferably a tri-or higher-valent linking group bonded to the carbonyl group via an oxygen atom, and more preferably a trivalent to hexavalent linking group bonded to the carbonyl group via an oxygen atom. Furthermore, $Z^4$ is preferably a group formed only from hydrogen, carbon, and oxygen atoms, and more preferably a group containing at least one aromatic ring.

Moreover, $Z^4$ is preferably (E-Z-1) to (E-Z-14) shown below.

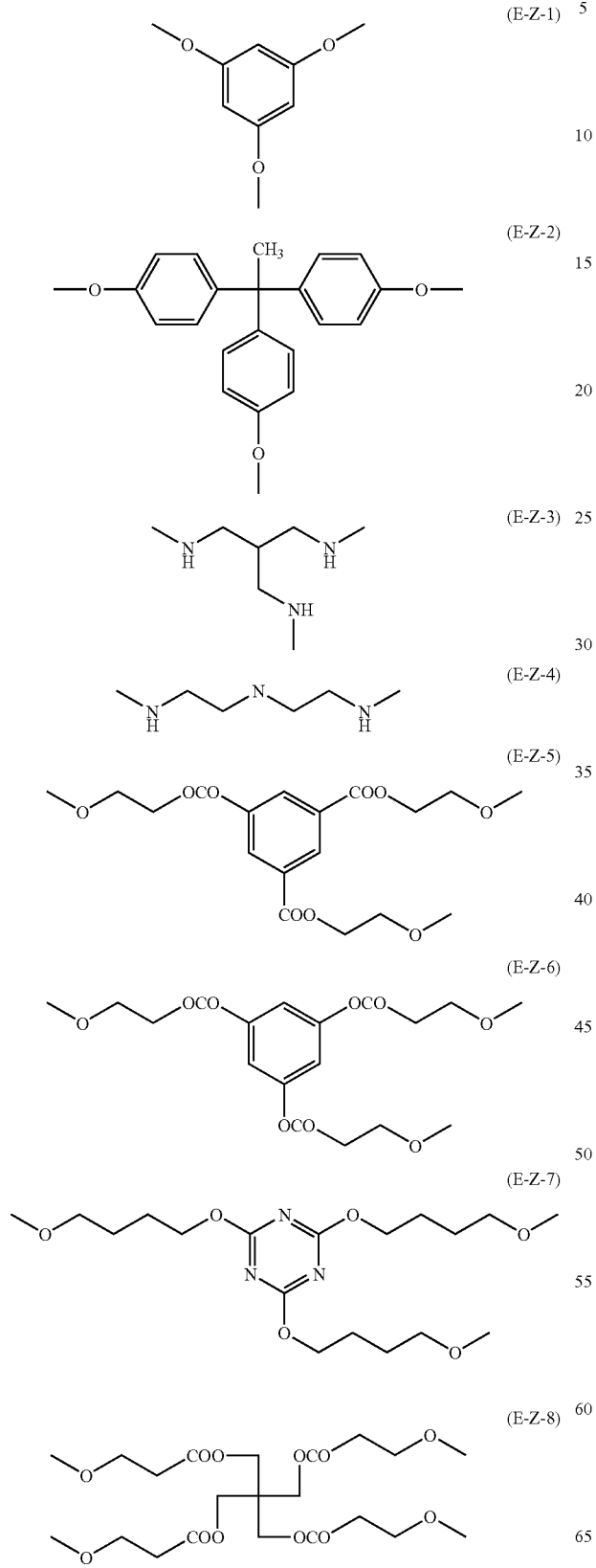

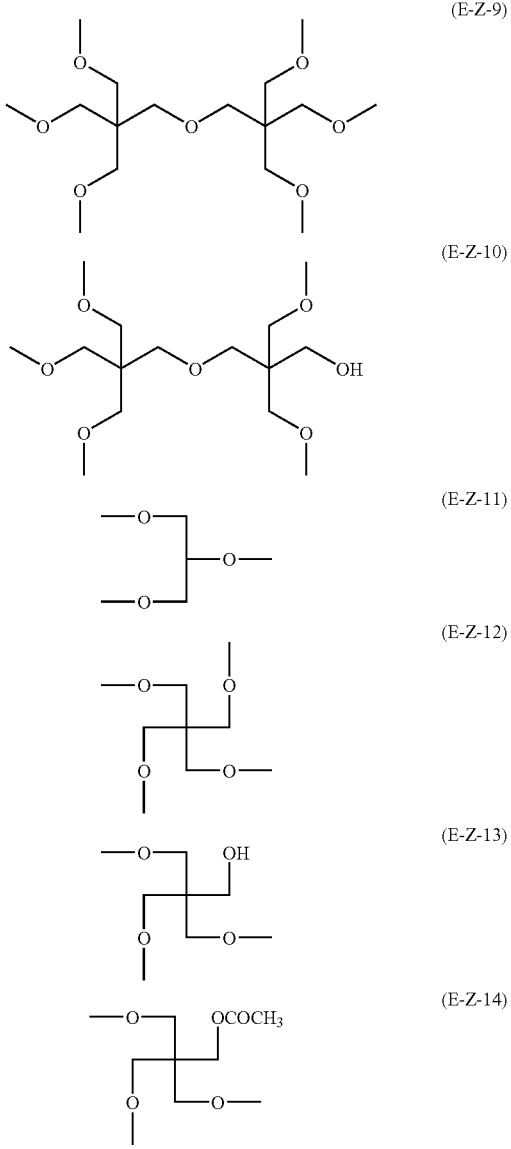

Among them, $Z^4$ is preferably a group formed only from hydrogen, carbon, and oxygen atoms, and is more preferably (E-Z-1), (E-Z-2), and (E-Z-5) to (E-Z-7).

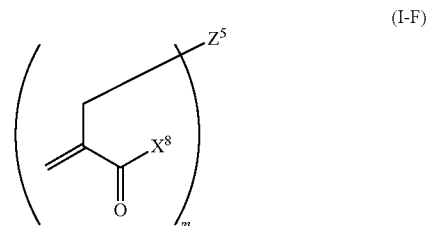

(I-F)

In Formula (I-F), the $X^8$s independently preferably denote a hydrogen atom or monovalent organic residue bonded via an oxygen atom or a nitrogen atom, $Z^5$ denotes a tri-or higher-valent linking group bonded to $X^8COC(=CH_2)CH_2$— via a heteroatom, and m denotes an integer of 3 or greater.

In Formula (I-F), the 3 or more $X^8$s may be identical to or different from each other, but it is preferable for them to be all the same.

The $X^8$s in Formula (I-F) are independently a monovalent organic residue bonded via an oxygen atom, are more preferably a straight-chain or branched alkoxy group having 1 to 15 carbon atoms, a straight-chain or branched substituted alkoxy group having 1 to 15 carbon atoms, an aryloxy group having 6 to 12 carbon atoms, a substituted aryloxy group having 6 to 15 carbon atoms, an amino group, or a substituted amino group having 1 to 10 carbon atoms, and yet more preferably a straight-chain or branched alkoxy group having 1 to 12 carbon atoms or a straight-chain or branched substituted amino group having 1 to 10 carbon atoms.

Preferred examples of the substituent in the substituted alkoxy group, the substituted aryloxy group, and the substituted acyloxy group include a halogen atom (—F, —Br, —Cl, —I), a hydroxy group, an alkoxy group having 1 to 5 carbon atoms, an aryloxy group having 6 to 12 carbon atoms, an acyloxy group having 2 to 5 carbon atoms, a cyano group, an alkyl group having 1 to 5 carbon atoms, and an aryl group having 6 to 12 carbon atoms.

It is preferable for m in Formula (I-F) to be an integer of 3 to 10, and more preferably an integer of 3 to 6.

$Z^5$ in Formula (I-F) is preferably a tri-or higher-valent linking group bonded to $X^8COC(=CH_2)CH_2$— via an oxygen atom, and more preferably a trivalent to hexavalent linking group bonded to $X^8COC(=CH_2)CH_2$— via an oxygen atom. Furthermore, $Z^5$ is preferably a group formed only from hydrogen, carbon, and oxygen atoms.

Moreover, $Z^5$ is preferably (F-Z-1) to (F-Z-9) shown below.

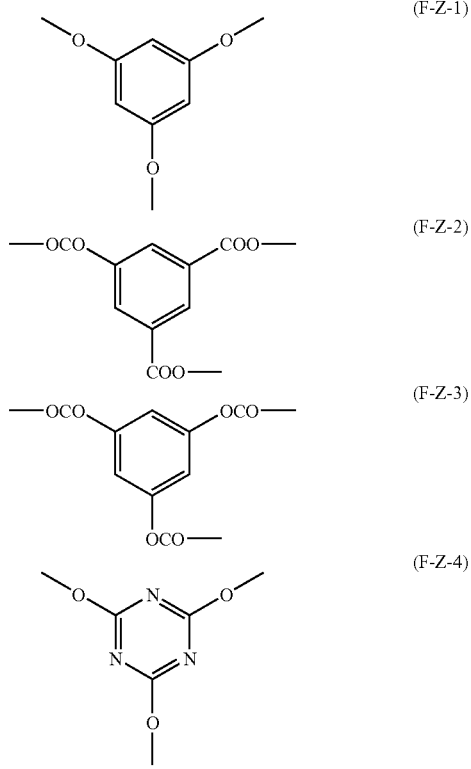

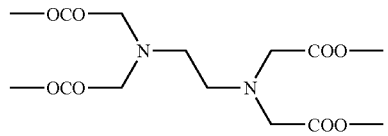

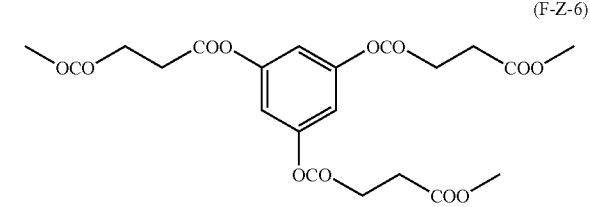

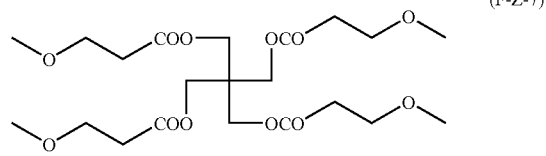

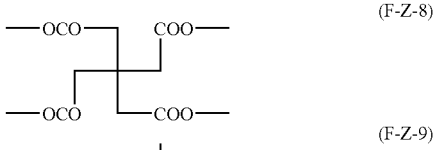

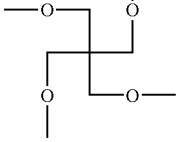

Among them, $Z^5$ is preferably a group formed only from hydrogen, carbon, and oxygen atoms, more preferably a group containing an aromatic ring, and yet more preferably a group selected from the group consisting of (F-Z-1) to (F-Z-4) and (F-Z-6).

Among the compounds represented by Formula (I), the polymer type compound iv) is preferably a compound having at least a structural unit selected from the group consisting of Formula (I-G-1), Formula (I-G-2), Formula (I-G-3), and Formula (I-G-4) shown below, and more preferably a compound having at least 50 wt % of a structural unit selected from the group consisting of Formula (I-G-1), Formula (I-G-2), Formula (I-G-3), and Formula (I-G-4).

Furthermore, the polymer type compound iv) may have a single type of structural unit represented by Formula (I-G-1) to (I-G-4) shown below or may have two or more types thereof, and with regard to one structural unit shown below (e.g. a structural unit represented by Formula (I-G-1)) there may be a single type on its own or may have two or more types thereof.

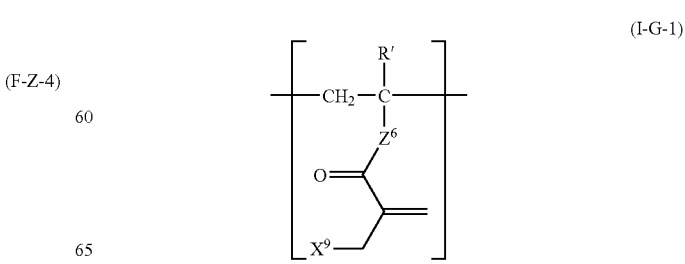

In Formula (I-G-1), $X^9$ denotes a hydrogen atom or monovalent organic residue bonded via a heteroatom, or a halogen atom, $Z^6$ denotes a divalent linking group, and R' denotes a hydrogen atom or a methyl group.

In the polymer type compound, when there are two or more $X^9$s, $Z^6$s, and R's, they may be identical to or different from each other, but it is preferably a compound having only one type of structural unit represented by Formula (I-G-1).

$X^9$ in Formula (I-G-1) is preferably a hydrogen atom or monovalent organic residue bonded via an oxygen atom, a nitrogen atom, or a sulfur atom, or a halogen atom, and the organic residue is preferably an acyloxy group having 2 to 5 carbon atoms or a heterocyclic group bonded via a heteroatom.

$Z^6$ in Formula (I-G-1) is preferably a group formed only from hydrogen, carbon, and oxygen atoms, is more preferably a group or bond selected from the group consisting of an alkylene group, an arylene group, a carbonyl group, an ether bond, and a carboxylic acid ester bond, or a group in which two or more of these groups or bonds are linked, and is yet more preferably an ether bond, —$CO_2CH_2CH_2O$—, or —$C_6H_4O$—.

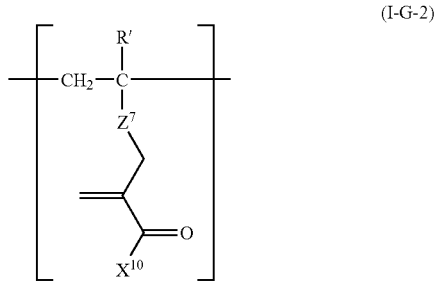

(I-G-2)

In Formula (I-G-2), $X^{10}$ denotes a monovalent organic residue bonded via a heteroatom, $Z^7$ denotes a divalent linking group, and R' denotes a hydrogen atom or a methyl group.

In the polymer type compound, when there are 2 or more $X^{10}$s, $Z^7$s, and R's, they may be identical to or different from each other, but it is preferably a compound having only one type of structural unit represented by Formula (I-G-2).

$X^{10}$ in Formula (I-G-2) is preferably a monovalent organic residue bonded via an oxygen atom, and is more preferably an alkoxy group having 1 to 6 carbon atoms or a substituted alkoxy group having 1 to 15 carbon atoms.

Preferred examples of the substituent in the substituted alkoxy group include a halogen atom (—F, —Br, —Cl, —I), a hydroxy group, an alkoxy group having 1 to 3 carbons, an aryloxy group having 6 to 12 carbon atoms, an acyloxy group having 2 to 5 carbon atoms, a cyano group, an alkyl group having 1 to 6 carbon atoms, and an aryl group having 6 to 12 carbon atoms.

$Z^7$ in Formula (I-G-2) is preferably a group formed only from hydrogen, carbon, and oxygen atoms, is more preferably a group or bond selected from the group consisting of an alkylene group, an arylene group, a carbonyl group, an ether bond, and a carboxylic acid ester bond, or a group in which two or more of these groups or bonds are linked, and is yet more preferably —COO—, —$C_6H_4O$—, or —$C_6H_4OCOCH_2CH_2COO$—.

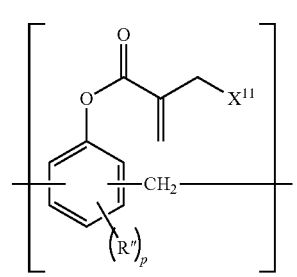

(I-G-3)

$X^{11}$ in Formula (I-G-3) denotes a hydrogen atom or monovalent organic residue bonded via a heteroatom, or a halogen atom, R" denotes a methyl group, and p denotes 0 or 1. Each group on the benzene ring may be bonded to any position of the benzene ring.

In the polymer type compound, when there are 2 or more $X^{11}$s, they may be identical to or different from each other, but it is preferably a compound having only one type of structural unit represented by Formula (I-G-3).

$X^{11}$ in Formula (I-G-3) is preferably a hydrogen atom or monovalent organic residue bonded via an oxygen atom, a nitrogen atom, or a sulfur atom, or a halogen atom, and is more preferably (G-X-1) or (G-X-2) shown below.

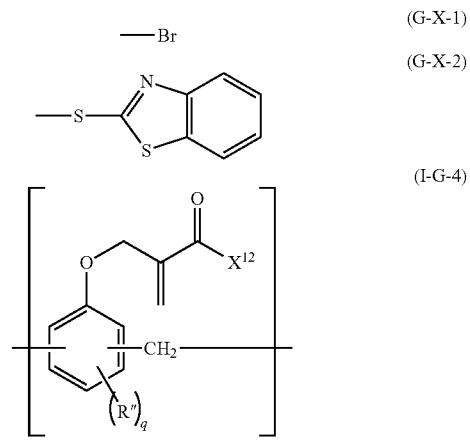

(G-X-1)

(G-X-2)

(I-G-4)

$X^{12}$ in Formula (I-G-4) denotes a monovalent organic residue bonded via a heteroatom, R" denotes a methyl group, and q denotes 0 or 1. Each group on the benzene ring may be bonded to any position of the benzene ring.

In the polymer type compound, when there are 2 or more $X^{12}$s, they may be identical to or different from each other, but it is preferably a compound having only one type of structural unit represented by Formula (I-G-4).

$X^{12}$ in Formula (I-G-4) is preferably a monovalent organic residue bonded via an oxygen atom, and is more preferably an alkoxy group having 1 to 6 carbon atoms or a substituted alkoxy group having 1 to 15 carbon atoms.

Preferred examples of the substituent in the substituted alkoxy group include a halogen atom (—F, —Br, —Cl, —I), a hydroxy group, an alkoxy group having 1 to 5 carbon atoms, an aryloxy group having 6 to 12 carbon atoms, an acyloxy group having 2 to 5 carbon atoms, a cyano group, an alkyl group having 1 to 6 carbon atoms, and an aryl group having 6 to 12 carbon atoms.

When the polymer type compound iv) has a structural unit represented by Formula (I-G-1) and/or Formula (I-G-2)

above, a preferred example of a structural unit other than these is a structural unit represented by Formula (G-Y-1) below.

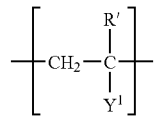
(G-Y-1)

In Formula (G-Y-1), $Y^1$ denotes a monovalent organic residue, and R' denotes a hydrogen atom or a methyl group.

Furthermore, the polymer type compound iv) may have a single type of structural unit represented by Formula (G-Y-1) or may have two or more types thereof.

$Y^1$ in Formula (G-Y-1) is preferably a carboxy group, an acyloxy group having 2 to 5 carbon atoms, or a substituted aryl group having 6 to 12 carbon atoms, and is more preferably —COOH, —OCOCH$_3$, or —C$_6$H$_4$OH.

When the polymer type compound iv) has a structural unit represented by Formula (I-G-3) and/or Formula (I-G-4) above, a preferred example of a structural unit other than these is a structural unit represented by Formula (G-Y-2) below.

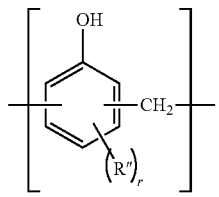
(G-Y-2)

In Formula (G-Y-2), R" denotes a methyl group, and r denotes 0 or 1. Furthermore, each group on the benzene ring may be bonded to any position on the benzene ring.

Furthermore, the polymer type compound iv) may have a single type of structural unit represented by Formula (G-Y-2) or may have two or more types thereof.

Compound examples of the compounds represented by Formula (I) are shown below in the order in which they are explained above, that is, the monofunctional type i), the difunctional type ii), the polyfunctional type iii), and the polymer type iv).

Other than the specific examples shown below, there are specific examples described in paragraphs 0043 to 0066 of JP-A-2001-92127 and paragraphs 0043 to 0051 of JP-A-2002-105128.

i) Monofunctional Type

TABLE 1

(Group A)

| No. | $X^1$ | $X^2$ |
|---|---|---|
| A-1 | OH | OCH$_3$ |
| A-2 | OH | O(n)C$_4$H$_9$ |
| A-3 | OH | O(n)C$_{12}$H$_{25}$ |
| A-4 | OH | O-CH$_2$-C$_6$H$_5$ |
| A-5 | OH | O-cyclohexyl |
| A-6 | OH | O-CH$_2$CH=CH$_2$ |
| A-7 | OH | O-C$_6$H$_4$-C(CH$_3$)$_3$ |
| A-8 | OCH$_3$ | OC$_2$H$_5$ |
| A-9 | O-CH(CH$_3$)$_2$ | O(n)C$_4$H$_9$ |
| A-10 | O(n)C$_8$H$_{17}$ | OCH$_3$ |
| A-11 | O-CH$_2$CH=CH$_2$ | O-CH$_2$CH=CH$_2$ |

TABLE 1-continued (Group A)

$$\underset{O}{\overset{X^1}{\underset{\|}{C}}}-X^2$$

| No. | X¹ | X² |
| --- | --- | --- |
| A-12 | O-CH₂-C₆H₅ (O-benzyl) | OCH₃ |
| A-13 | O-C₆H₅ (O-phenyl) | OCH₃ |
| A-14 | O-CH₂CH₂-Cl | OCH₃ |
| A-15 | O-CH₂CH₂-OCOCH₃ | OC₂H₅ |
| A-16 | O-(CH₂)₄-CN | OC₂H₅ |
| A-17 | OCOCH₃ | OCH₃ |
| A-18 | OCO(n)C₆H₁₃ | OCH₃ |
| A-19 | OCO-C₆H₅ | OCH₃ |
| A-20 | OSO₂CH₃ | OCH₃ |
| A-21 | OSO₂(n)C₄H₉ | OCH₃ |
| A-22 | OSO₂-C₆H₄-CH₃ (p-tolyl) | OCH₃ |
| A-23 | OSO₂CF₃ | OC₂H₅ |
| A-24 | SCH₃ | OC₂H₅ |
| A-25 | S(n)C₄H₉ | OC₂H₅ |
| A-26 | S-C₆H₅ | OC₂H₅ |
| A-27 | S-(benzothiazol-2-yl) | OCH₃ |
| A-28 | S-(6-chlorobenzoxazol-2-yl) | OCH₃ |
| A-29 | F | O(n)C₁₂H₂₅ |
| A-30 | F | O-CH₂-C₆H₅ |
| A-31 | Cl | OCH₃ |
| A-32 | Cl | O-C₆H₄-C(CH₃)₂CH₂C(CH₃)₃ |

TABLE 1-continued
(Group A)
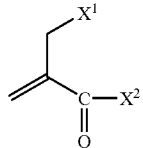
| No. | X¹ | X² |
|---|---|---|
| A-33 | Br | O(n)C₄H₉ |
| A-34 | Br | (3-heptyloxy) |
| A-35 | I | O(n)C₄H₉ |
| A-36 | I | OCH₂CH₂-phenyl |
| A-37 | N(CH₃)₂ | OC₂H₅ |
| A-38 | morpholino | OC₂H₅ |
| A-39 | pyrrolidino | OC₂H₅ |
| A-40 | thiomorpholino | OC₂H₅ |
| A-41 | 4-(ethoxycarbonyl)piperidino | OC₂H₅ |
| A-42 | N(CH₃)(CH₂-phenyl) | OC₂H₅ |
TABLE 2
(Group B)
B-1 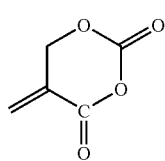
TABLE 2-continued
(Group B)
B-2 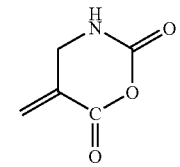

TABLE 2-continued (Group B)

| No. | Structure |
|---|---|
| B-3 | 3-methyl-5-methylene-1,3-oxazinan-2,6-dione-like structure |
| B-4 | 5-methylene-1,3-oxazinane-2,4-dione |
| B-5 | 3-butyl-5-methylene-1,3-oxazinane-2,4-dione |
| B-6 | 2-phenyl-5-methylene-6H-1,3-oxazin-4(5H)-one |
| B-7 | 2-phenyl-5-methylene-1,3-oxathian-6-one |
| B-8 | 3-methylene-2-oxetanone |
| B-9 | 1-methyl-3-methylene-azetidin-2-one | ii) Difunctional Type

TABLE 3

(Group C)

$$\text{X}^1\text{-CH}_2\text{-C(=CH}_2\text{)-C(=O)-Z}^1\text{-C(=O)-C(=CH}_2\text{)-CH}_2\text{-X}^1$$

| No. | X¹ | Z¹ |
|---|---|---|
| C-1 | OH | —O—(CH₂)₆—O— |
| C-2 | OH | —O—(CH₂)₁₂—O— |
| C-3 | OCOCH₃ | —O—CH₂CH₂—O—CH₂CH₂—O—CH₂CH₂—O— |
| C-4 | OCOCH₃ | —O—CH₂CH₂—(O—CH₂CH₂)₂₁—O— |
| C-5 | OH | —O—CH₂—(p-C₆H₄)—CH₂—O— |
| C-6 | OH | —O—(p-C₆H₄)—O— |

TABLE 3-continued
(Group C)
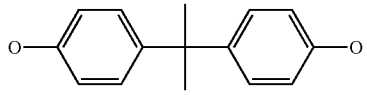
| No. | X¹ | Z¹ |
|---|---|---|
| C-7 | OH | 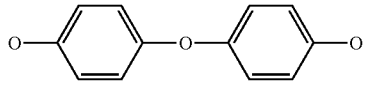 |
| C-8 | OH | 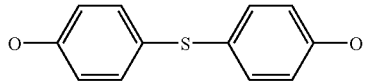 |
| C-9 | OCH₃ | 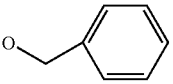 |
| C-10 | 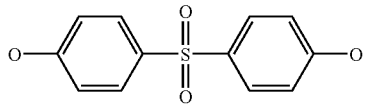 | 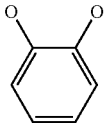 |
| C-11 | OCOC₂H₅ | 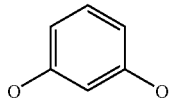 |
| C-12 | OCOC₂H₅ | 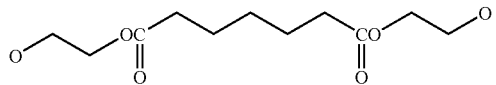 |
| C-13 | OH | 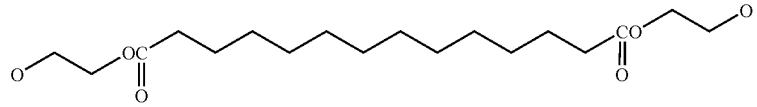 |
| C-14 | OCOCH₃ | 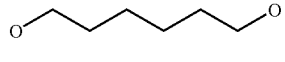 |
TABLE 4
(Group D)
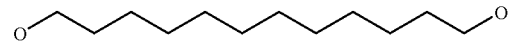
| No. | X² | Z² |
|---|---|---|
| D-1 | OCH₃ | O⁓⁓⁓O |
| D-2 | OCH₃ | O⁓⁓⁓⁓⁓⁓O |

TABLE 4-continued (Group D)

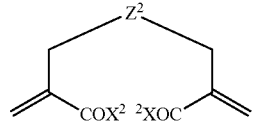

| No. | X² | Z² |
|---|---|---|
| D-3 | OC₂H₅ | O-CH₂CH₂-O-CH₂CH₂-O-CH₂CH₂-O |
| D-4 | OC₂H₅ | O-(CH₂CH₂-O)₂₁-  (mean number) |
| D-5 | O-CH₂-CH=CH₂ | O-CH₂-(1,4-C₆H₄)-CH₂-O |
| D-6 | O-CH₂-C₆H₅ | O-(1,4-C₆H₄)-O |
| D-7 | OCH₃ | OCO-(CH₂)₃-COO |
| D-8 | OCH₃ | OCO-(CH₂)₈-COO |
| D-9 | O(n)C₄H₉ | OCO-(1,4-C₆H₄)-COO |
| D-10 | O(n)C₄H₉ | OCO-CH₂-(1,4-C₆H₄)-CH₂-COO |
| D-11 | O-CH₂CH₂-OCH₃ | OCO-(1,4-C₆H₁₀)-COO |
| D-12 | O-CH₂CH₂-N(CH₃)₂ | OCONH-(CH₂)₆-NHCOO |
| D-13 | OCH₃ | OCONH-(1,3-C₆H₄)-NHCOO |
| D-14 | OCH₃ | OCONH-(4-C₆H₄)-C(CH₃)₂-(4-C₆H₄)-NHCOO |
| D-15 | OCH₃ | OSO₂-(CH₂)₄-SO₂O |
| D-16 | O(n)C₁₂H₂₅ | OSO₂-(trimethylphenylene)-SO₂O |

TABLE 4-continued (Group D)

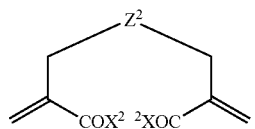

| No. | X² | Z² |
|---|---|---|
| D-17 | OCH₃ | OCO~~~COO~~~OCO~~~COO |
| D-18 | OCH₃ | OCO~~~CONH~~~NHCO~~~COO |
| D-19 | OCH₃ | OCO~~~CO(O~~~OCO-C₆H₄-CO)₂₀~~~OCO~~~COO (mean number) |
| D-20 | OC₂H₅ | OCO~~~CONH~~~O |
| D-21 | OCH₃ | OCO~~~O |
| D-22 | SCH₃ | OCO~~~OCO |
| D-23 | S-C₆H₅ | OCO~~~OCO |
| D-24 | 5-chloro-benzothiazol-2-ylthio | OCO~~~OCO |
| D-25 | N(CH₃)(C₂H₅) | OCO~~~OCO |
| D-26 | morpholino | OCO~~~OCO |
| D-27 | NH(n)C₁₂H₂₅ | OCO~~~OCO |
| D-28 | OCH₃ | S~~~S |
| D-29 | OCH₂CH₂OH | S~~~S |
| D-30 | O~~~OCOCH₃ | NHCO~~~CONH | iii) Polyfunctional Group
TABLE 5
(Group E)
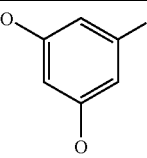
| No. | X¹ | Z³ |
|-----|-----|-----|
| E-1 | OH | 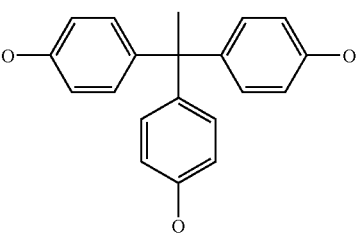 |
| E-2 | OCH₃ | 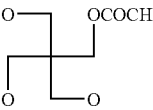 |
| E-3 | OCOCH₃ | 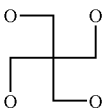 |
| E-4 | OH | 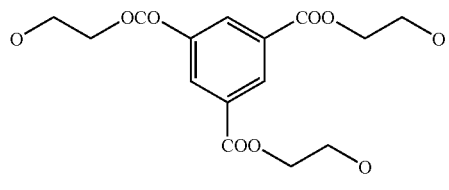 |
| E-5 | OCOCH₃ | 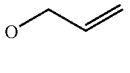 |
| E-6 | 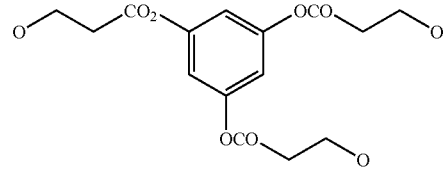 | 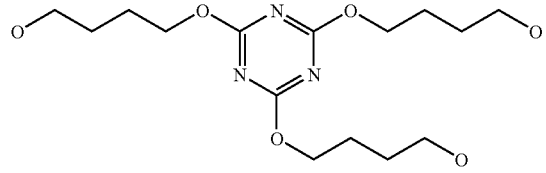 |
| E-7 | OH | 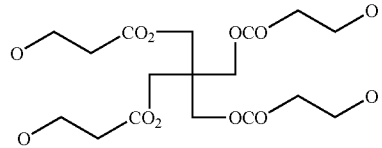 |
| E-8 | OH |  |

TABLE 5-continued
(Group E)
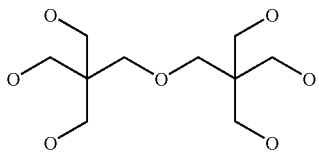
($n \geqq 3$)
| No. | $X^1$ | $Z^3$ |
|---|---|---|
| E-9 | OH | 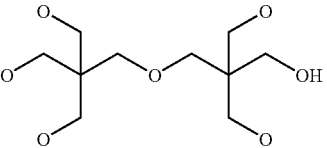 |
| E-10 | OCOCH₃ | 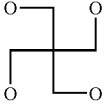 |
| E-11 | SCH₃ | 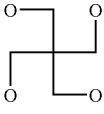 |
| E-12 | Cl | 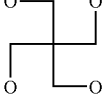 |
| E-13 | Br | 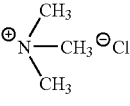 |
| E-14 | 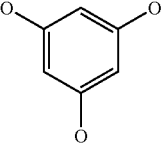 | 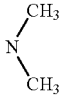 |
| E-15 | 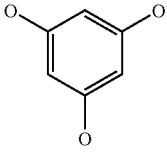 | 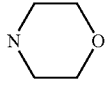 |
| E-16 | 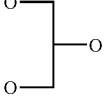 | 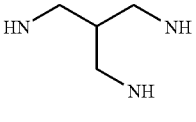 |
| E-17 | OCO(n)C₁₂H₂₅ | 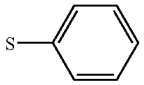 |
| E-18 |  | HN—CH₂CH₂—N—CH₂CH₂—NH |

TABLE 5-continued
(Group E)
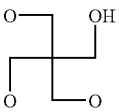
($n \geqq 3$)
| No. | $X^1$ | $Z^3$ |
|---|---|---|
| E-19 | 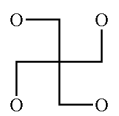 | 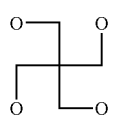 |
| E-20 | 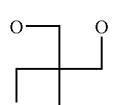 | |
| E-21 | NHCOCH$_3$ | |
| E-22 | 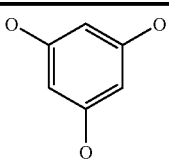 | |
TABLE 6
(Group F)
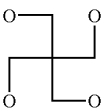
($n \geq 3$)
| No. | $X^2$ | $Z^4$ |
|---|---|---|
| F-1 | OH | 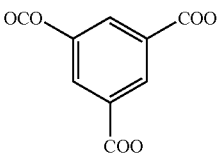 |
| F-2 | OCH$_3$ | |
| F-3 | OCH$_3$ | |
| F-4 | OCH$_3$ | 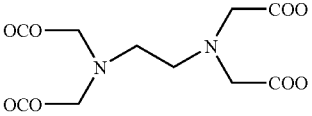 |

TABLE 6-continued (Group F)

$$\left(\begin{array}{c}-Z^4\\ \phantom{-}\\ C-X^2\\ \parallel\\ O\end{array}\right)_n \quad (n \geq 3)$$

| No. | $X^2$ | $Z^4$ |
|---|---|---|
| F-5 | $OC_2H_5$ | cyanuric (triazine-2,4,6-triyl with three O linkages) |
| F-6 | $OCH_3$ | 1,3,5-tris(β-carboxyethyloxycarbonyl)benzene |
| F-7 | $OCH_3$ | pentaerythritol tetra(β-carboxyethyl ether) |
| F-8 | $O(n)C_3H_7$ | pentaerythritol tetra(carboxylate) |
| F-9 | $N(CH_3)_2$ | benzene-1,3,5-tricarboxylate |
| F-10 | $O(n)C_{12}H_{25}$ | benzene-1,3,5-tricarboxylate | iv) Polymer Type

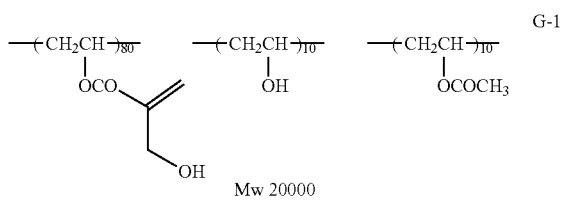

G-1

Mw 20000

-continued
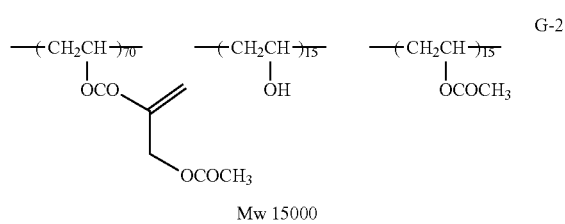
G-2
Mw 15000
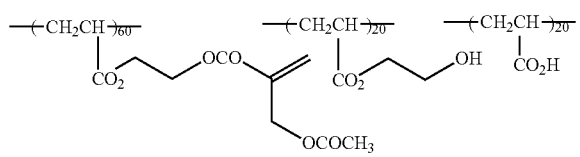
G-3
Mw 30000
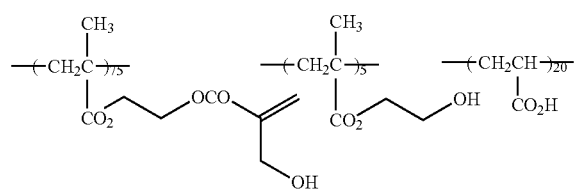
G-4
Mw 50000
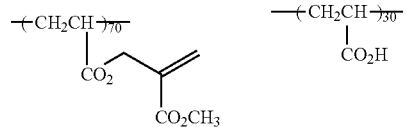
G-5
Mw 20000
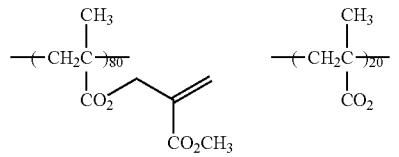
G-6
Mw 10000
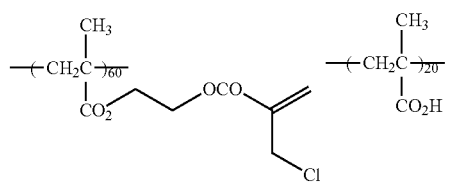
G-7
Mw 20000

-continued
G-8
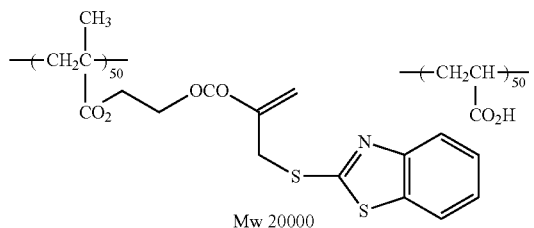
G-9
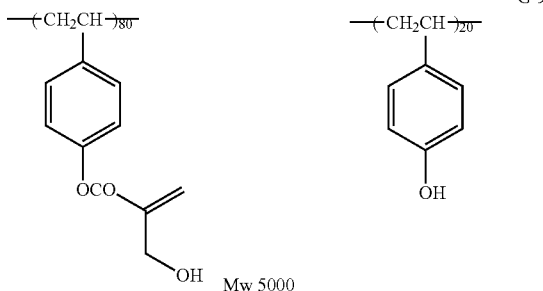
G-10
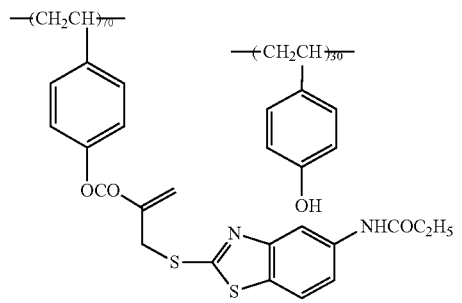
G-11
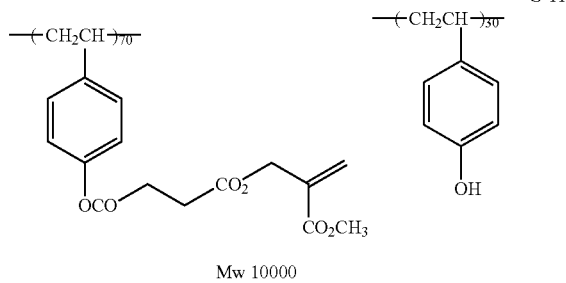
G-12
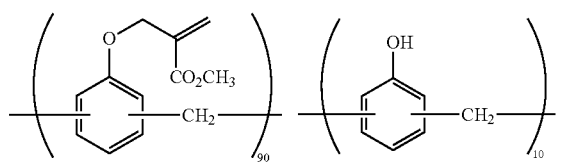

-continued

G-13
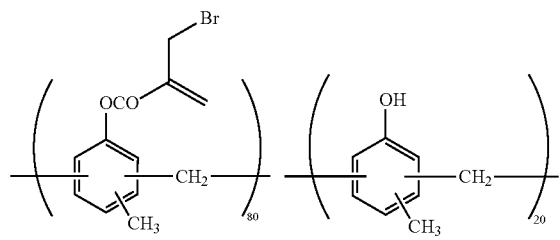
(m/p=6/4)    (m/p=6/4)
Mw 7500

G-14
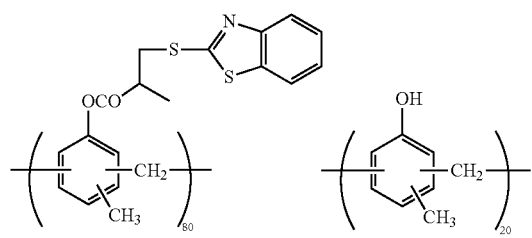
(m/p=7/3)    (m/p=7/3)
Mw 4000

G-15
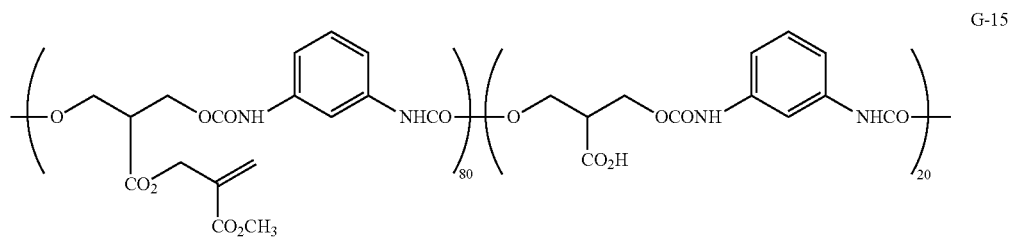
Mw 10000

Compound examples of the compounds represented by Formula (I) in the case of $Q^1$ is a cyano group are shown below in the order of the monofunctional type i), the difunctional type ii), the polyfunctional type iii), and the polymer type iv).

i) Monofunctional Type

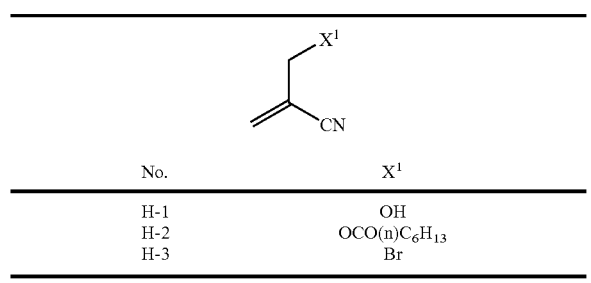

| No. | $X^1$ |
|---|---|
| H-1 | OH |
| H-2 | OCO(n)C$_6$H$_{13}$ |
| H-3 | Br | ii) Difunctional Type

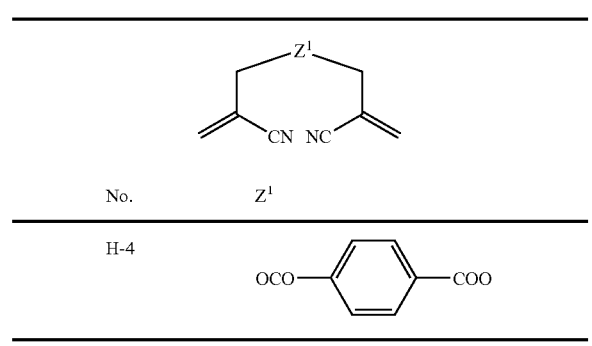

| No. | $Z^1$ |
|---|---|
| H-4 | OCO—⟨phenyl⟩—COO | iii) Polyfunctional Type
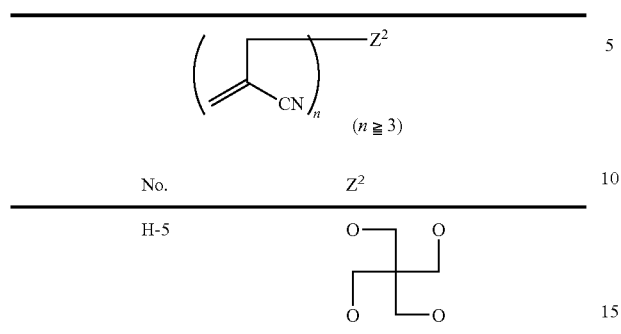
iv) Polymer Type
(Group J)
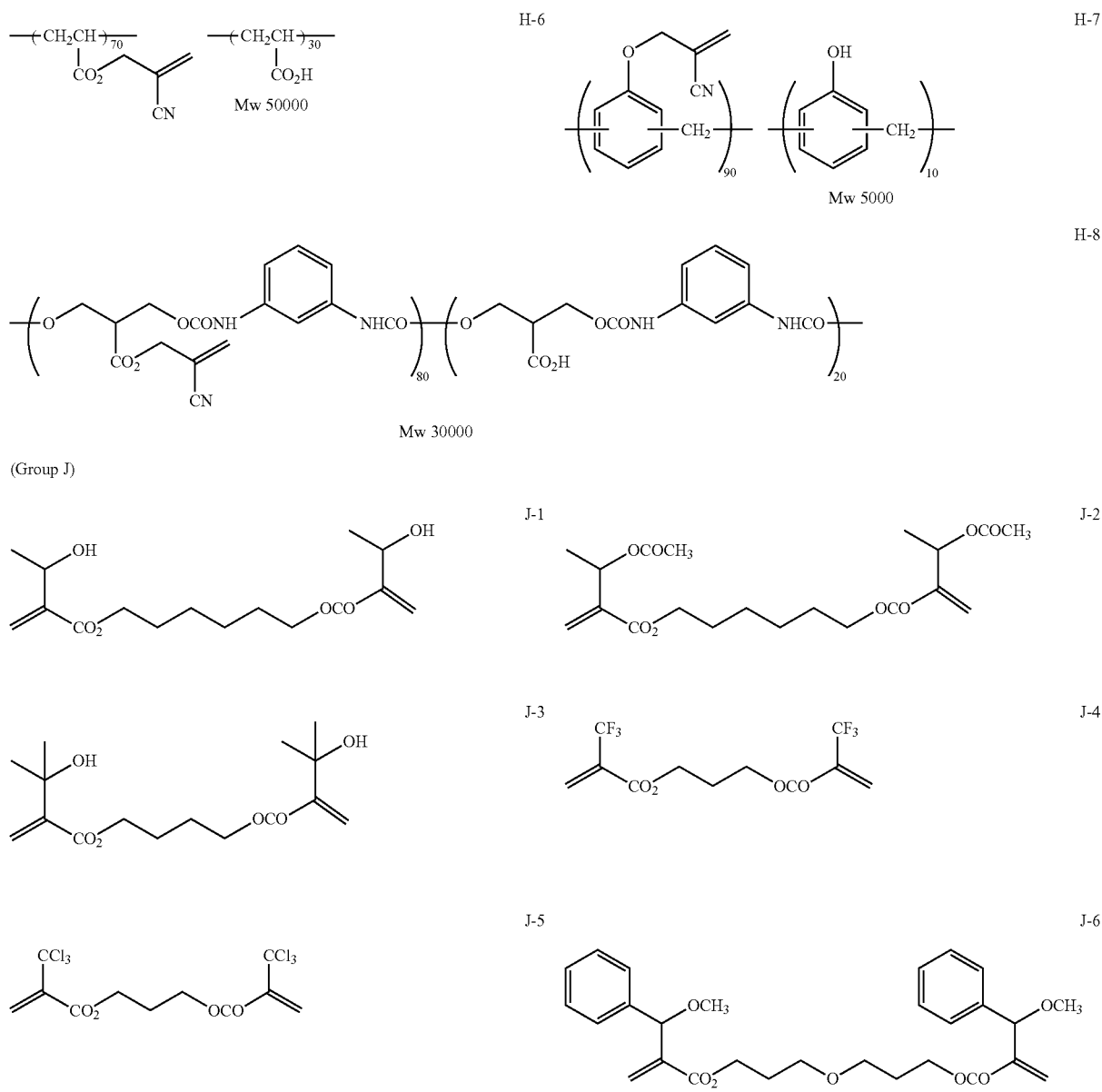

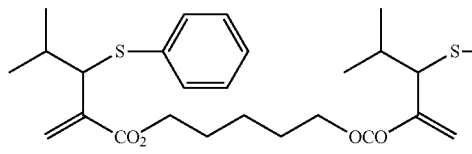

J-7

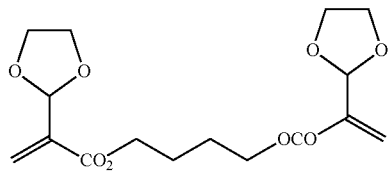

J-8

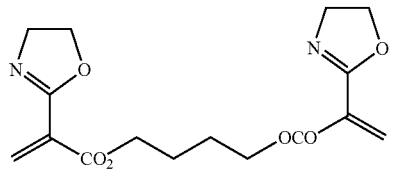

J-9

A method for producing the compound represented by Formula (I) is not particularly limited; it may be synthesized by a known method, and the following method can be cited as one example.

Among the compound examples listed above, with regard to A-1, A-12, A-17, A-22, A-27, A-38, B-5, C-1, D-7, E-4, F-3, G-5, and G-13, a synthetic method therefor is described in paragraphs 0322 to 0335 of JP-A-2001-92127. The other compound examples may be synthesized in accordance with the above synthetic method. Furthermore, with regard to compound examples H-1, H-2, H-3, H-4, and H-5, a synthetic method therefor is described in paragraphs 0178 to 0182 of JP-A-2002-105128. The other compound examples may be synthesized in accordance with the above synthetic method.

In the present invention, the compound represented by Formula (I) is preferably at least one compound selected from the group consisting of A-4, A-5, A-19, A-42, C-7, C-10, C-12, D-5, D-9, E-5, E-15, E-16, F-3, F-5, F-9, G-5, and G-8. Among them, the compound represented by Formula (I) contained in the polymerizable composition used for the tacky material is preferably at least one compound selected from the group consisting of A-4, A-5, A-42, C-7, C-12, D-9, E-5, E-15, F-5, and G-8. Furthermore, the compound represented by (I) contained in the polymerizable composition used for the adhesive is preferably at least one compound selected from the group consisting of A-5, A-19, C-7, C-10, D-5, E-16, F-3, F-9, and G-5.

Furthermore, in the present invention, a mode in which two or more types of compound represented by Formula (1) are used in combination is also preferable. With regard to the mode for combined use, there is a mode in which compounds from the same group among group A to group G are used in combination, or a mode in which compounds from at least two different groups are used in combination, and the mode in which compounds from at least two different groups are used in combination is preferable. A mode in which at least one compound selected from the monofunctional compound groups (group A and group B) and at least one compound selected from the di-or higher-functional polyfunctional compound groups (group C to group G) are used in combination is more preferable. Furthermore, a mode in which at least two di-or higher-functional polyfunctional compound groups (group C to group G) are used in combination is also more preferable.

The polymerizable composition of the present invention may comprise a polymerizable compound other than the compound represented by Formula (I). Examples of the other polymerizable compound except for the compound represented by Formula (I) include known polymerizable compounds such as acrylic acid esters, normal methacrylic acid esters having no heteroatom on the α-carbon atom of the ethylenically unsaturated double bond, acrylamides, normal methacrylamides having no heteroatom on the α-carbon atom of the ethylenically unsaturated double bond, vinyl esters, aromatic group-containing ethylenically unsaturated compounds such as styrene, acrylonitriles, (meth)acrylamides, maleic anhydride, maleimide, cyanulate, and isocyanulate. Specific examples thereof include polymerizable compounds described in paragraphs 0051 to 0056 of JP-A-2002-107927 and in paragraph 0010 of JP-A-H5-214299.

The content of the compound represented by Formula (I) is preferably at least 30 wt % relative to the weight of all the components of the polymerizable composition, more preferably at least 50 wt %, and particularly preferably at least 70 wt %.

The polymerizable composition of the present invention comprises a macromolecule having a monomer unit represented by Formula (II) or another addition-polymerizable macromolecule.

The macromolecule having a monomer unit represented by Formula (II) is now explained.

The macromolecule having a monomer unit represented by Formula (II) is explained below.

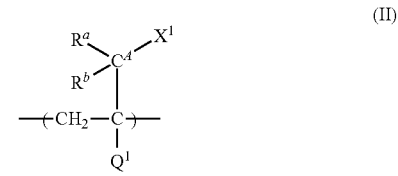

(II)

In Formula (II), $Q^1$, $X^1$, $X^2$, $R^a$, and $R^b$ have the same meanings as $Q^1$, $X^1$, $X^2$, $R^a$, and $R^b$ in Formula (I), and preferred ranges are also the same. When a compound represented by Formula (I) and a macromolecule having a monomer unit represented by Formula (II) are used in combination, $Q^1$, $X^1$, $X^2$, $R^a$, and $R^b$ may be identical to or different from each other.

$X^1$ and/or $X^2$ preferably have at least one substituent selected from the group consisting of an alkyl group having 4 to 12 carbon atoms (C) (including a cycloalkyl group, which is a preferable alicyclic structure), a C4 to C20 substituted alkyl group, a C6 to C12 aryl group, a C6 to C20 substituted aryl group, and a heterocyclic group containing as a hetero atom O, N, or S, and more preferably have at least one substituent selected from the group consisting of a cyclic alkyl group having 4 to 12 carbon atoms, an aryl group, and a heterocyclic group. Examples of the cyclic alkyl group include a cyclopentyl group, a cyclohexyl group, and a 2-norbornyl group, examples of the aryl group include a phenyl group, and examples of the heterocyclic group include a morpholino group.

The monomer unit represented by Formula (II) is preferably a monomer unit represented by Formula (II-A) or Formula (II-B) below.

The macromolecule having a monomer unit represented by Formula (II) is preferably a compound having at least 20 wt % of a monomer unit represented by Formula (II-A) and/or Formula (II-B), and more preferably a compound having 20 to 80 wt % thereof. Furthermore, the macromolecule having a monomer unit represented by Formula (II) may have one type of monomer unit represented by Formula (II-A) or Formula (II-B) on its own or two or more types thereof.

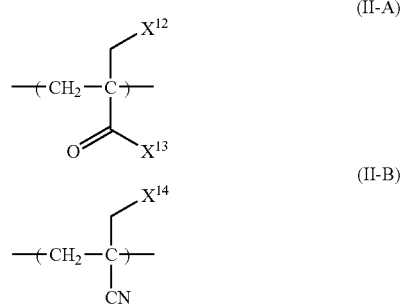

$X^{12}$ in Formula (II-A) denotes a hydrogen atom or monovalent organic residue bonded via a heteroatom, or a halogen atom, and $X^{13}$ denotes a monovalent organic residue bonded via a heteroatom.

$X^{12}$ in Formula (II-A) is preferably a hydrogen atom or monovalent organic residue bonded via an oxygen atom, a sulfur atom, or a nitrogen atom, or a halogen atom.

Specifically, it is more preferably a hydroxy group, a heterocyclic group bonded via a heteroatom, a straight-chain or branched alkoxy group having 1 to 10 carbon atoms, a straight-chain or branched substituted alkoxy group having 1 to 15 carbon atoms, an acyloxy group having 1 to 10 carbon atoms, an aryloxy group having 6 to 12 carbon atoms, or a substituted aryloxy group having 6 to 20 carbon atoms.

$X^{13}$ in Formula (II-A) is preferably a monovalent organic residue bonded via an oxygen atom, is more preferably a hydroxy group, a straight-chain or branched alkoxy group having 1 to 12 carbon atoms, a straight-chain or branched substituted alkoxy group having 1 to 20 carbon atoms, an aryloxy group having 6 to 18 carbon atoms, or a substituted aryloxy group having 6 to 20 carbon atoms, and is yet more preferably a straight-chain or branched alkoxy group having 1 to 6 carbon atoms.

Preferred examples of the substituent in the substituted alkoxy group and substituted aryloxy group include a halogen atom (—F, —Br, —Cl, —I), a hydroxy group, an alkoxy group having 1 to 6 carbon atoms, an aryloxy group having 6 to 12 carbon atoms, an acyloxy group having 2 to 5 carbon atoms, a cyano group, a straight-chain or branched alkyl group having 1 to 8 carbon atoms, and an aryl group having 6 to 12 carbon atoms.

$X^{14}$ in Formula (II-B) has the same meaning as $X^{12}$ in Formula (II-A), and a preferred range is also the same.

It may be a homopolymer formed from a monomer unit represented by the above Formula (II-A) or (II-B) alone or may be a copolymer comprising another monomer unit.

Preferred examples of said other monomer unit include structural units represented by Formula (II-C) below.

In Formula (II-C), $Y^2$ denotes a monovalent organic residue, and R' denotes a hydrogen atom or a methyl group.

Furthermore, the macromolecule having a monomer unit represented by Formula (II) may have one type of structural unit represented by Formula (II-C) on its own or may have two or more types thereof.

$Y^2$ in Formula (II-C) is preferably a carboxy group, a carboxylic acid alkyl ester group having 2 to 20 carbon atoms, an acyloxy group having 2 to 8 carbon atoms, an aryl group having 6 to 12 carbon atoms, a substituted aryl group having 6 to 12 carbon atoms, or a cyano group, and more preferably —OCOCH$_3$, —OCOCH$_2$CH=CH$_2$, —C$_6$H$_5$, or —C$_6$H$_4$OH.

Preferred examples of said other monomer unit include monomer units derived from known monomers such as an acrylic acid ester, a methacrylic acid ester, an acrylamide, a methacrylamide, a vinyl ester, a styrene, acrylic acid, methacrylic acid, acrylonitrile, maleic anhydride, and maleimide.

The polymer obtained by polymerizing a monomer unit having a structure represented by Formula (II) may be any of a random polymer, a block polymer, a graft polymer, etc., and is preferably a random polymer.

Specific examples of the polymer obtained by polymerizing a monomer unit having a structure represented by Formula (II) are shown below.

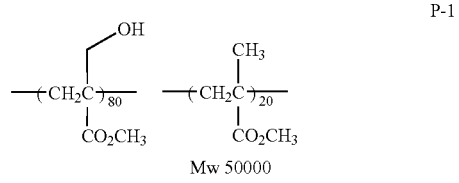

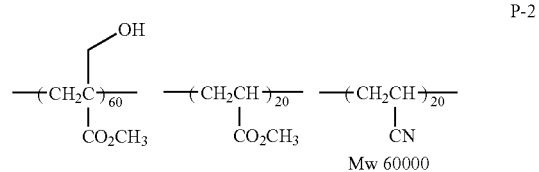

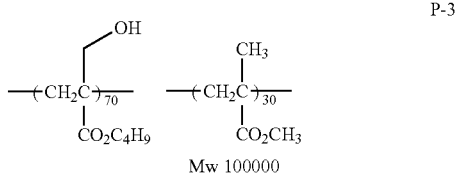

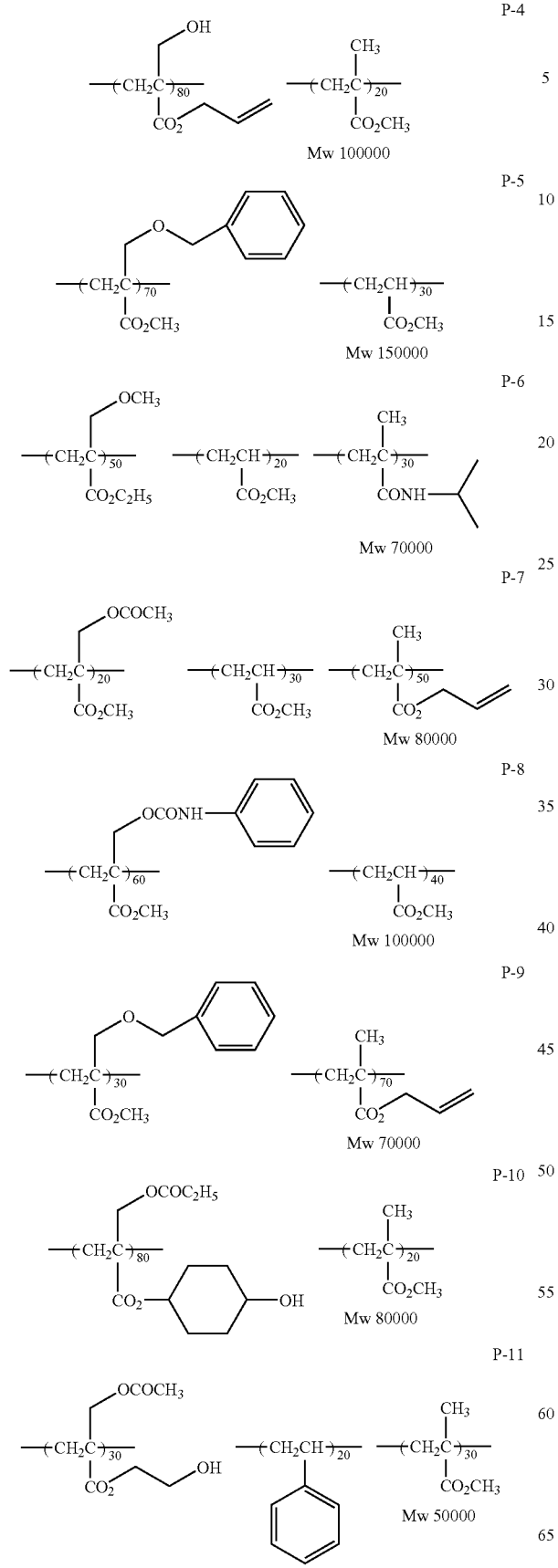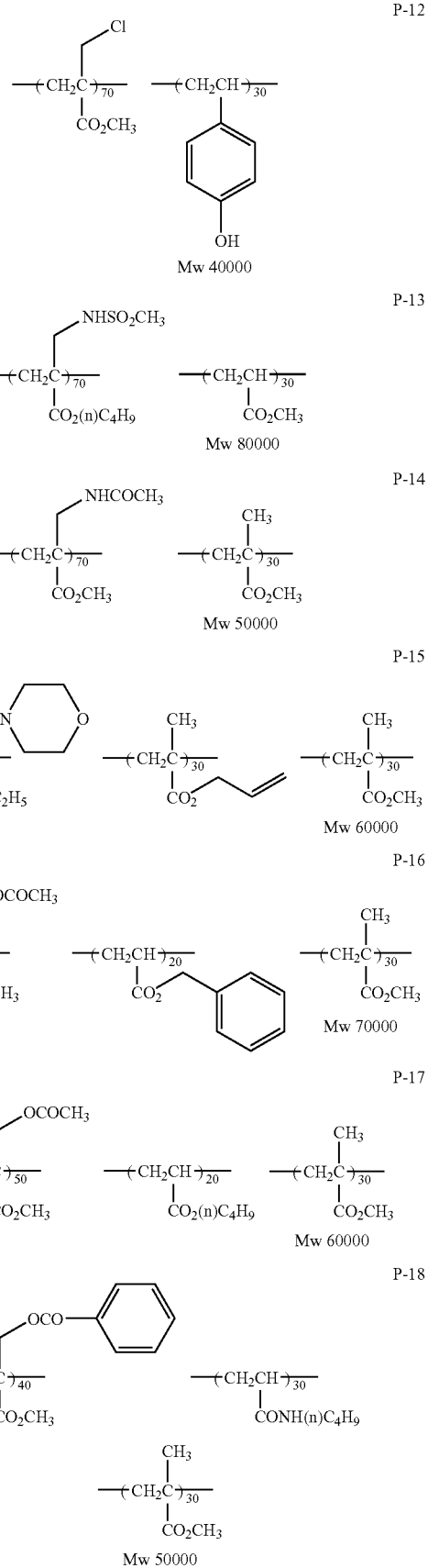

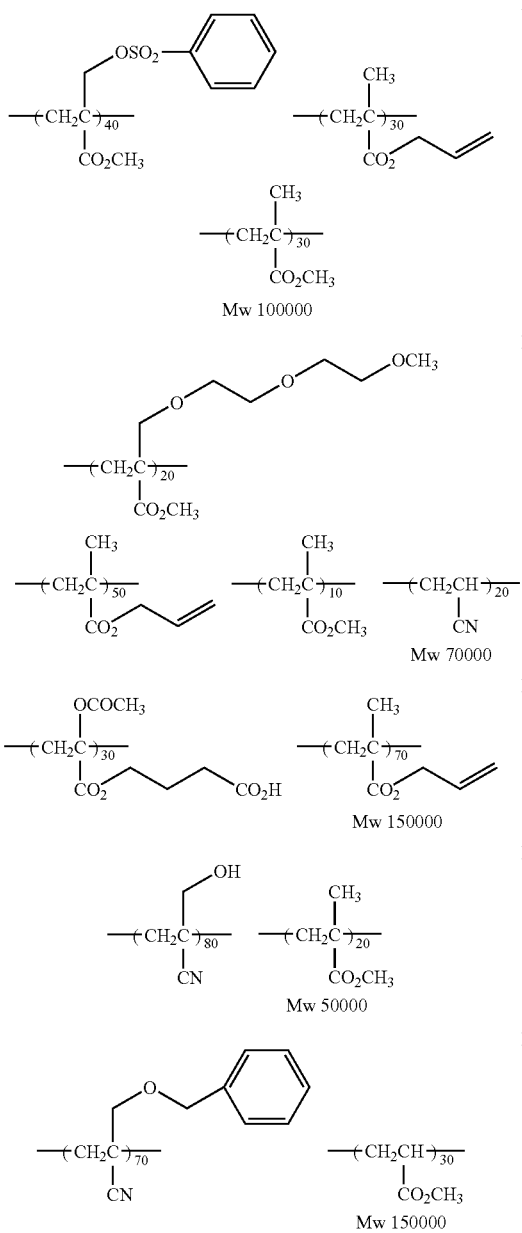

In the present invention, the macromolecule having a monomer unit represented by Formula (II) is preferably at least one compound selected from the group consisting of P-1, P-3, P-5, P-7, P-9, P-11, P-16, P-17, and P-23. Among them, the macromolecule contained in the polymerizable composition used for the tacky material is preferably at least one compound selected from the group consisting of P-1, P-3, P-5, P-7, P-9, P-11, and; P-17. Furthermore, the macromolecule contained in the polymerizable composition used for the adhesive is preferably at least one compound selected from the group consisting of P-1, P-5, P-7, P-9, P-11, P-16, and P-23.

Furthermore, in the present invention, a mode in which two or more types of macromolecules having a monomer unit represented by Formula (II) are used in combination is also preferable.

Synthesis of Macromolecule Having Monomer Unit Represented by Formula (II)

SYNTHETIC EXAMPLE 1

Compound P-1

In a flask, A-1 (0.8 mol), methyl methacrylate (0.2 mol), V-65 (azo type thermal polymerization initiator, manufactured by Wako Pure Chemical Industries, Ltd.) (0.03 mol), and N,N-dimethylacetamide (1 L) were mixed and stirred at 70° C. for 5 hours. After the reaction, the reaction mixture was added little by little to 5 L of water while stirring, and a white powder was precipitated. This powder was collected by filtration and dried to give P-1 in a yield of 90%. The structure of this material was confirmed by NMR, IR, and GPC.

SYNTHETIC EXAMPLE 2

Compound P-3

In a flask, A-2 (0.7 mol), methyl methacrylate (0.3 mol), V-65 (azo type thermal polymerization initiator, manufactured by Wako Pure Chemical Industries, Ltd.) (0.03 mol), and N,N-dimethylacetamide (1 L) were mixed and stirred at 70° C. for 5 hours. After the reaction, the reaction mixture was added little by little to 5 L of water while stirring, and a white powder was precipitated. This powder was collected by filtration and dried to give P-3 in a yield of 93%. The structure of this material was confirmed by NMR, IR, and GPC.

SYNTHETIC EXAMPLE 3

Compound P-5

In a flask, α-benzyloxy methlmethacrylate (0.7 mol), methyl acrylate (0.3 mol), V-65 (azo type thermal polymerization initiator, manufactured by Wako Pure Chemical Industries, Ltd.) (0.03 mol), and N,N-dimethylacetamide (1 L) were mixed and stirred at 70° C. for 5 hours. After the reaction, the reaction mixture was added little by little to 5 L of water while stirring, and a white powder was precipitated. This powder was collected by filtration and dried to give P-5 in a yield of 95%. The structure of this material was confirmed by NMR, IR, and GPC.

All of the polymers shown as specific examples may be synthesized in accordance with the Synthetic Examples above.

The polymerizable composition of the present invention may comprise another macromolecule instead of the macromolecule having a monomer unit represented by Formula (II) or in addition to the macromolecule having a monomer unit represented by Formula (II).

Examples of said other macromolecule include polymethyl methacrylate, a methacrylic acid copolymer, an acrylic acid copolymer, an itaconic acid copolymer, a crotonic acid copolymer, a maleic acid copolymer, and a partially esterified maleic acid copolymer. When another macromolecule is used in combination with the macromolecule having a monomer unit represented by Formula (II), the two are preferably compatible with each other. Specific examples of said other macromolecule include macromolecules described in paragraph 0063 of JP-A-2002-107927.

The content of the macromolecule having a monomer unit represented by Formula (II) is preferably at least 30 wt % relative to the weight of the total macromolecule components, more preferably at least 50 wt %, and particularly preferably at least 70 wt %.

Macromolecular Filler

The polymerizable composition of the present invention comprises a macromolecular filler.

The polymerizable composition of the present invention may be used in various types of applications, and examples thereof include applications described in (1) and (2) below.
(1) Tacky material represented by dicing tape
(2) Adhesive Macromolecular fillers preferably used in the above-mentioned two applications are explained below.

Examples of macromolecular fillers used in the polymerizable composition of the present invention include a rubber, an acrylic-olefin copolymer resin, a polyurethane resin, a polyester resin, a polyvinylacetal resin, a xylene resin, a styrene resin, an acrylic resin, an epoxy resin, and a phenolic resin, and a rubber, an acrylic-olefin copolymer resin, a polyvinylacetal resin, a polyurethane resin, a polyester resin, a xylene resin, and a styrene resin are preferable.

When the polymerizable composition of the present invention is used as (1) the tacky material, from the viewpoint of improving discrimination between before and after radiation curing, it is preferable to use polymethyl methacrylate and a polyurethane resin in combination; when it is used as (2) the adhesive, from the viewpoint of increasing adhesive strength after radiation curing, it is preferable to use a xylene resin in combination with an acrylic rubber and a polyvinylacetal resin.

The amount of macromolecular filler added relative to the polymerizable composition varies according to the intended application of the polymerizable composition of the present invention. In the case of (1) the tacky material, the amount of filler added is preferably 20 to 40 parts by weight, and more preferably 25 to 35 parts by weight. Furthermore, the amount of polyurethane resin added in a system in which polymethyl methacrylate and the polyurethane resin are used in combination is preferably 1 to 20 parts by weight, and more preferably 5 to 15 parts by weight. On the other hand, in the case of (2) the adhesive, the amount of filler added is preferably 20 to 40 parts by weight, and more preferably 25 to 35 parts by weight. Furthermore, the amount of xylene resin added in a system in which the xylene resin is used in combination with an acrylic rubber and a polyvinylacetal resin is preferably 5 to 15 parts by weight. Moreover, the amount of polyvinylacetal resin added is preferably 1 to 20 parts by weight, and more preferably 5 to 15 parts by weight.

Tackifier

When the polymerizable composition of the present invention is used as (2) the adhesive, a tackifier may be used.

The tackifier is added to a macromolecule so as to impart tackiness thereto, and a rubber-based pressure-sensitive adhesive employs as a main component a resin-form tackifier in order for tackiness to be exhibited. The amount of tackifier added is approximately 60 to 110 parts relative to 100 parts of the rubber. For an acrylic pressure-sensitive adhesive, if the tackifier is used, it is a small amount. As a tackifier that is used in a large amount, there are oligomers obtained from $C_5$ and $C_9$ fractions during oil refining. A tackifier from the $C_5$ fraction contains a hydrogenated component and is compatible with many pressure-sensitive adhesives. Commonly used tackifiers include natural rosin ester, coumarone-indene resin, and a copolymer between α-methylstyrene and vinyltoluene, which show similar properties to those of $C_9$ hydrocarbon-based tackifiers.

When the polymerizable composition of the present invention is used as (2) the adhesive, in order to improve product quality, an antifoaming agent and a leveling agent may be added.

Polymerization Initiator

In the present invention, a polymerization initiator may be used.

A polymerization initiator that can be used in the polymerizable composition of the present invention is a compound that absorbs external energy and forms a radical polymerization initiating species. External energy used for initiating polymerization is roughly divided into heat and actinic radiation, and a thermal polymerization initiator and a photopolymerization initiator are used respectively. Examples of actinic radiation include γ-rays, β-rays, an electron beam, UV rays, visible rays, and infrared rays, and UV rays are preferable.

As the polymerization initiator, a known radical polymerization initiator may be used. The radical polymerization initiator may be used on its own or in a combination of two or more types thereof. Examples thereof include chloroacetophenone, diethoxyacetophenone, α-aminoacetophenone, a benzophenone, a benzoinalkyl ether, benzil dimethyl ketal, methyl-o-benzoyl benzoate, thioxanthone, chlorothioxanthone, dodecylthioxanthone, dimethylthioxanthone, diethylthioxanthone, an acylphosphine oxide, a glyoxy ester, 3-ketocoumarin, 2-ethylanthraquinone, camphorquinone, benzil, Michler's ketone, α-hydroxycyclohexyl phenyl ketone, and 2-hydroxymethylphenylpropane, and among them α-hydroxycyclohexyl phenyl ketone is preferable.

The content of the polymerization initiator is preferably 0.005 to 10 wt % of the total amount of the polymerizable composition from the viewpoint of sensitivity, more preferably 0.01 to 7 wt %, and most preferably 0.02 to 5 wt %.

Support

The tacky material (1) may employ a support.

The support is not particularly limited as long as it transmits radiation, and a plastic, a rubber, etc. is preferably used. Specific examples of such a support include homopolymers or copolymers of an α-olefin such as polyethylene, polypropylene, an ethylene-propylene copolymer, polybutene-1, poly-4-methylpentene-1, an ethylene-vinyl acetate copolymer, an ethylene-ethyl acrylate copolymer, an ethylene-acrylic acid copolymer, and an ionomer, vinyl chloride-based homopolymers or copolymers such as polyvinyl chloride, a vinyl chloride-vinyl acetate copolymer, and a vinyl chloride-ethylene-vinyl acetate copolymer, fluorine-based polymers such as a vinyl fluoride-ethylene copolymer, a vinylidene fluoride-ethylene copolymer, a tetrafluoroethylene-hexafluoropropylene copolymer, and a tetrafluoroethylene-perfluoroalkyl vinyl ether copolymer, and engineering plastics such as polyethylene terephthalate, polycarbonate, and polymethyl methacrylate, which may be used singly or as mixtures. The shape of the support is generally sheet or film form, the support comprises a single layer or a plurality of layers of the above-mentioned resin, and its thickness is preferably on the order of 10 to 200 μm, more preferably on the order of 25 to 150 μm, and most preferably 40 to 100 μm.

Examples of a substrate to which the adhesive (2) of the present invention suitably adheres include a metal such as aluminum, iron, copper, zinc, or tin, an alloy thereof, glass, wood, and an organic macromolecule, and among them a combination of metal and glass and a combination of metal and an organic macromolecule are preferable. Such a substrate may be subjected to a surface roughening treatment.

Additive

The tacky material (1) may employ an additive. By the use of an additive, discrimination between before and after the irradiation with radiation becomes good, and an excellent tacky material is obtained. As the additive, a cyanurate or isocyanurate compound is preferably used, and a polyfunctional isocyanurate is more preferable.

This cyanurate or isocyanurate compound is a compound that has a triazine or isotriazine ring in the molecule and further has a radiation-polymerizable ethylenically unsaturated double bond, and it may be a monomer, an oligomer, or a mixture thereof. A compound having a triazine or isotriazine ring may generally be synthesized by a standard cyclization reaction using as a starting material a halocyan compound, a dianiline compound, a diisocyanate compound, etc. A compound thus synthesized is further subjected to introduction of a radiation-polymerizable ethylenically unsaturated double bond-containing group such as, for example, a functional group containing a vinyl group, an allyl group, an acryloxy group, a methacryloxy group, etc., thus giving a compound used in the present invention.

In the present invention, other than the above-mentioned points, the cyanurate or isocyanurate compound is not particularly limited, but in more detail the ethylenically unsaturated double bond group introduced into the triazine or isotriazine ring preferably does not contain a so-called rigid molecular structure, for example, an aromatic ring, a heterocyclic group, etc. This is because, if excess rigidity is imparted to the polymerizable composition thereby, the tacky material becomes excessively brittle by exposure to radiation. Therefore, a linking group between the ethylenically unsaturated double bond and the triazine or isotriazine ring preferably contains a group in which the atoms thereof have high freedom to rotate. Examples of such groups include aliphatic groups such as an alkylene group and an alkylidene group, and they may have —O—, —OCO—, —COO—, —NHCO—, and —NHCOO— bonds. When this linking group bonds to a triazine ring via —O—, at least one of three alkylene or alkylidene groups bonded to the —O—'s may have at least two carbon atoms.

Specific examples of such a cyanurate or isocyanurate compound include 2-propenyidi-3-butenyl cyanurate, 2-hydroxyethylbis(2-acryloxyethyl) isocyanurate, tris(acryloxyethyl) isocyanurate, tris(methacryloxyethyl) isocyanurate, bis(2-acryloxyethyl)-2-{(5-acryloxyhexyl)oxy}ethyl isocyanurate, tris(1,3-diacryloxy-2-propyloxycarbonylamino-n-hexyl) isocyanurate, tris(1-acryloxyethyl-3-methacryloxy-2-propyloxycarbonylamino-n-hexyl) isocyanurate, and tris (4-acryloxy-n-butyl) isocyanurate.

The number of ethylenically unsaturated double bonds per monomer or oligomer repeating unit of the above-mentioned cyanurate or isocyanurate compound is normally preferably at least 2, and more preferably 2 to 6. When the number of double bonds is less than 2, a degree of crosslinking sufficient to decrease the tack strength by irradiation with radiation cannot be obtained, and when it exceeds 6, the pressure-sensitive adhesive becomes excessively brittle after irradiation with radiation.

The amount of cyanurate or isocyanurate compound added to the polymerizable composition of the present invention is preferably 1 to 500 parts by weight relative to 100 parts by weight of the compound represented by Formula (I), more preferably 2 to 400 parts by weight, and yet more preferably 3 to 300 parts by weight. It is not desirable for the amount thereof added to be too small since the level of three-dimensional network structure of the tacky material produced by irradiation with radiation is insufficient, thus making it impossible to control inhibition of the flowability of an acrylic pressure-sensitive adhesive, and the chip-fixing tack strength does not decrease to a degree such that a chip can easily be picked up. On the other hand, when the amount thereof added is too large, the effect in plasticizing the acrylic pressure-sensitive adhesive is too large, and a chip-fixing tack strength that is sufficient to withstand the cutting impact of a rotating round blade during dicing or the water pressure of washing water cannot be obtained.

In accordance with the present invention, a polymerizable composition with high sensitivity, high discrimination, and high stability, and a tacky material comprising the polymerizable composition can be provided.

Furthermore, in accordance with the present invention, a polymerizable composition with high adhesive strength, high sensitivity, and high stability, and an adhesive comprising the polymerizable composition can be provided.

EXAMPLES

The present invention is explained in detail below by specific reference to Examples and Comparative Examples, but the present invention is not limited to the Examples below. 'Parts' denotes parts by weight unless otherwise specified.

Example 1

| | |
|---|---:|
| Polymerizable compound [X] of Table 1: (A-4) | 50 parts |
| Macromolecule [Y] of Table 1: (P-1) | 50 parts |
| Filler 1: polymethyl methacrylate (average particle size 8 μm) (Jurymer MB-1, manufactured by Nippon Junyaku Co., Ltd.) | (30-r) parts |
| Filler 2: polyurethane resin (average particle size 7 μm) (Daimic Beads, manufactured by Dainichiseika Color & Chemicals Mfg. Co., Ltd.) | r parts |
| Initiator: α-hydroxycyclohexyl phenyl ketone | 0.5 parts |
| Additive: polyfunctional isocyanate (Coronate L, manufactured by Nippon Polyurethane Industry Co., Ltd.) | 1.5 parts |

A tacky polymerizable composition prepared by mixing the above was applied on a 100 μm thick polyester film so as to give a dry thickness of 20 μm, thus giving a dicing tape.

Evaluation of Discrimination

With regard to the dicing tape above, the larger the ratio of tack strength between that before and that after irradiation with UV rays (tack strength before irradiation/tack strength after irradiation: g/25 mm width), the better the discrimination.

A dicing tape was affixed to the surface of a 5 inch diameter silicon wafer, and tack strength was measured before and after irradiation with UV rays in accordance with JIS-Z0237 (peeling off at 90°, peeling speed 50 mm/min). A UV lamp employed a high-pressure mercury lamp with 80 W/cm², and the irradiation time was 10 sec. The results are given in Table 1.

Evaluation of Sensitivity

The 5 inch diameter silicon wafer fixed to the dicing tape was fully cut into 20×20 mm chip pieces by means of a rotating round blade while washing with water, dried, and then irradiated with UV rays by means of a high-pressure mercury lamp while varying the UV irradiation time from 5 sec to 20 sec in 1 sec steps, subsequently a chip was picked up, and the irradiation time that gave good pick-up properties was measured to give an evaluation of sensitivity. The shorter the time to give good pick-up properties, the higher the sensitivity. An allowable level for a product was determined as being 8 sec or less from the viewpoint of improvement of productivity. The results are given in Table 1.

Evaluation of Stability

The dicing tape before irradiation with UV rays was held at 45° C. for 3 days. Subsequently, the same sensitivity test as above was carried out, and the stability was evaluated. The shorter the time to give good pick-up properties, the higher the sensitivity, and an allowable level for a product was determined as being 10 sec or less from the viewpoint of improvement of productivity. The results are given in Table 1.

Examples 2 to 8

These were carried out in the same manner as in Example 1 except that the polymerizable compounds and the macromolecules shown in Table 1 were used, with Filler 1 used at 30-r parts and Filler 2 used at r parts, and discrimination, sensitivity, and stability were evaluated. The results are given in Table 1.

Example 9

This was carried out in the same manner as in Example 1 except that the polymerizable compound shown in Table 1 was used, and 2-ethylhexyl acrylate/n-butyl acrylate (copolymer ratio 30:70 Mw 20,000) was used as the macromolecule, with Filler 1 used at 20 parts and Filler 2 used at 10 parts, and discrimination, sensitivity, and stability were evaluated. The results are given in Table 1.

Example 10

This was carried out in the same manner as in Example 1 except that the polymerizable compound shown in Table 1 was used, and 2-ethylhexyl acrylate/n-butyl acrylate (copolymer ratio 30:70 Mw 20,000) was used as the macromolecule, with Filler 1 used at 30 parts, and discrimination, sensitivity, and stability were evaluated. The results are given in Table 1.

Example 11

This was carried out in the same manner as in Example 1 except that the macromolecule shown in Table 1 was used, and a mixture of tris(2-acryloxyethyl) isocyanurate and C-7 at 50 wt % each was used as the polymerizable compound, with Filler 1 used at 25 parts and Filler 2 used at 5 parts, and discrimination, sensitivity, and stability were evaluated. The results are given in Table 1.

Example 12

This was carried out in the same manner as in Example 1 except that the macromolecule shown in Table 1 was used, and a mixture of 70 wt % of (2-acryloxyethyl) isocyanurate and 30 wt % of A-5 was used as the polymerizable compound, with Filler 1 used at 25 parts and Filler 2 used at 5 parts, and discrimination, sensitivity, and stability were evaluated. The results are given in Table 1.

Comparative Examples 1 to 4

These were carried out in the same manner as in Example 1 except that the polymerizable compounds and the macromolecules shown in Table 1 were used, with Filler 1 used at 30-r parts and Filler 2 used at r parts, and discrimination, sensitivity, and stability were evaluated. The results are given in Table 1.

TABLE 1

| Ex. Comp. Ex. | [X]  | [Y]  | r  | Discrimination | Sensitivity | Stability |
|---|---|---|---|---|---|---|
| Ex. 1       | A-4  | P-1  | 5  | 140 | 7  | 7  |
| Ex. 2       | A-42 | P-3  | 0  | 130 | 8  | 8  |
| Ex. 3       | C-12 | P-5  | 10 | 150 | 7  | 8  |
| Ex. 4       | D-9  | P-7  | 10 | 160 | 6  | 9  |
| Ex. 5       | E-5  | P-9  | 10 | 150 | 8  | 8  |
| Ex. 6       | E-15 | P-3  | 5  | 140 | 7  | 8  |
| Ex. 7       | F-5  | P-11 | 10 | 150 | 7  | 7  |
| Ex. 8       | G-8  | P-17 | 5  | 140 | 7  | 8  |
| Ex. 9       | A-4  | Y1   | 10 | 130 | 7  | 8  |
| Ex. 10      | D-9  | Y1   | 0  | 120 | 7  | 9  |
| Ex. 11      | X1   | P-1  | 5  | 120 | 7  | 8  |
| Ex. 12      | X2   | P-1  | 5  | 130 | 8  | 8  |
| Comp. Ex. 1 | T1   | Y1   | 0  | 110 | 10 | 15 |
| Comp. Ex. 2 | T2   | Y1   | 0  | 80  | 10 | 13 |
| Comp. Ex. 3 | T3   | Y1   | 0  | 60  | 9  | 18 |
| Comp. Ex. 4 | T4   | Y1   | 10 | 110 | 9  | 20 |

Symbols in the table denote the following.
X1: tris(2-acryloxyethyl) isocyanurate/C-7 = 50/50 (wt %)
X2: tris(2-acryloxyethyl) isocyanurate/A-5 = 70/30 (wt %)
T1: tris(2-acryloxyethyl) isocyanurate
T2: hexanediol diacrylate
T3: triethylene glycol diacrylate
T4: pentaerythritol tetraacrylate Y1: 2-ethylhexyl acrylate/n-butyl acrylate=30/70 (mol %) Mw 20,000

From the results shown in Table 1, the dicing tape of the present invention had high sensitivity, high discrimination, and high stability.

Example 13

| | |
|---|---|
| Polymerizable compound [X] of Table 1: (A-1) | 50 parts |
| Macromolecule [Y] of Table 1: (P-1) | 10 parts |
| Filler 1: acrylic rubber (Toaacron PS-210: manufactured by Tohpe K.K.) | (30-r) parts |
| Filler 2: xylene resin (Daimic Beads, manufactured by Dainichiseika Color & Chemicals Mfg. Co., Ltd.) | 10 parts |
| Filler 3: polyvinylacetal resin (S-LEC B, manufactured by Sekisui Chemical Co., Ltd.) | r parts |
| Initiator: benzil dimethyl ketal (IRGACURE 651, manufactured by Ciba-Geigy Ltd.) | 2 parts |
| Antifoaming agent: BYK-020 (manufactured by BYK-Chemie) | 1 part |

A polymerizable composition prepared by mixing the above was dispersed by means of a high speed stirrer, thus giving an adhesive. A coating was formed by coating a stainless support with the adhesive, a glass plate was placed thereon, and the thickness of this coating was adjusted to 50 μm.

Evaluation of Adhesive Strength

The adhesive was subjected to a 180 degree peel test in accordance with a test method of JIS-Z0237. Adhesive strength was evaluated by irradiating and curing the coating with UV rays at an exposure of 400 mJ/cm$^2$ by means of a metal halide lamp. The higher the value for the adhesive strength, the better the change in physical properties due to light. When the value was 3.0 (kg/inch) or greater, it was evaluated as being suitable. The results are given in Table 2.

Evaluation of Sensitivity

The exposure was varied from 400 mJ/cm$^2$ to 1,000 mJ/cm$^2$ in steps of 50 mJ/cm$^2$, and an exposure that gave an adhesive strength of 3.0 (kg/inch) or greater was measured and used for evaluation of the sensitivity. The smaller the exposure, the better the sensitivity, and an allowable exposure level for a product was determined as being 450 mJ/cm² sec or below from the viewpoint of improvement of productivity. The results are given in Table 2.

Evaluation of Stability

The adhesive before irradiation with UV rays was held at 45° C. for 3 days. Subsequently, the same sensitivity test as above was carried out, and the stability was evaluated. The smaller the exposure, the better the sensitivity, and an allowable exposure level for a product was determined as being 550 mJ/cm² sec or below from the viewpoint of improvement of productivity. The results are given in Table 2.

Examples 14 to 20

These were carried out in the same manner as in Example 13 except that the polymerizable compounds and the macromolecules shown in Table 2 were used, with Filler 1 used at 30-r parts and Filler 3 used at r parts, and adhesive strength, sensitivity, and stability were evaluated. The results are given in Table 2.

Example 21

This was carried out in the same manner as in Example 13 except that the polymerizable compound shown in Table 2 was used, and 2-ethylhexyl acrylate/n-butyl acrylate (copolymer ratio 30:70 Mw 20,000) was used as the macromolecule, with Filler 1 used at 25 parts and Filler 3 used at 5 parts, and adhesive strength, sensitivity, and stability were evaluated. The results are given in Table 2.

Example 22

This was carried out in the same manner as in Example 13 except that the polymerizable compound shown in Table 2 was used, and 2-ethylhexyl acrylate/n-butyl acrylate (copolymer ratio 30:70 Mw 20,000) was used as the macromolecule, with Filler 1 used at 30 parts, and adhesive strength, sensitivity, and stability were evaluated. The results are given in Table 2.

Example 23

This was carried out in the same manner as in Example 13 except that the macromolecule shown in Table 2 was used, and a mixture of tris(2-acryloxyethyl) isocyanurate and C-7 at 50 wt % each was used as the polymerizable compound, with Filler 1 used at 20 parts and Filler 3 used at 10 parts, and adhesive strength, sensitivity, and stability were evaluated. The results are given in Table 2.

Example 24

This was carried out in the same manner as in Example 13 except that the macromolecule shown in Table 2 was used, and a mixture of 70 wt % of tris(2-acryloxyethyl) isocyanurate and 30 wt % of C-5 was used as the polymerizable compound, with Filler 1 used at 25 parts and Filler 2 used at 5 parts, and adhesive strength, sensitivity, and stability were evaluated. The results are given in Table 2.

Comparative Examples 5 to 8

These were carried out in the same manner as in Example 13 except that the polymerizable compounds and the macromolecules shown in Table 2 were used, with Filler 1 used at 30-r parts and Filler 3 used at r parts, and adhesive strength, sensitivity, and stability were evaluated. The results are given in Table 2.

TABLE 2

| Ex. Comp. Ex. | [X] | [Y] | r | Adhesive strength given by light | Sensitivity | Stability |
|---|---|---|---|---|---|---|
| Ex. 13 | A-5 | P-1 | 0 | 3.8 | 400 | 500 |
| Ex. 14 | A-19 | P-5 | 0 | 4.1 | 350 | 500 |
| Ex. 15 | C-10 | P-9 | 5 | 4.5 | 300 | 550 |
| Ex. 16 | D-5 | P-7 | 10 | 5 | 300 | 400 |
| Ex. 17 | E-16 | P-16 | 10 | 3.5 | 350 | 450 |
| Ex. 18 | F-3 | P-3 | 5 | 3.5 | 350 | 500 |
| Ex. 19 | F-9 | P-11 | 10 | 4.7 | 400 | 500 |
| Ex. 20 | G-5 | P-23 | 5 | 3.4 | 400 | 450 |
| Ex. 21 | A-5 | Y1 | 5 | 3.5 | 400 | 500 |
| Ex. 22 | D-5 | Y1 | 0 | 4.2 | 450 | 500 |
| Ex. 23 | X3 | P-9 | 10 | 3.8 | 400 | 450 |
| Ex. 24 | X4 | P-9 | 5 | 3.7 | 300 | 500 |
| Comp. Ex. 5 | T5 | Y2 | 0 | 2 | 550 | 600 |
| Comp. Ex. 6 | T6 | Y2 | 0 | 2.9 | 550 | 650 |
| Comp. Ex. 7 | T7 | Y2 | 10 | 1.2 | 500 | 650 |
| Comp. Ex. 8 | T8 | Y2 | 5 | 1.6 | 500 | 800 |

Symbols in the table denote the following.
X3: tris(2-acryloxyethyl) isocyanurate/C-7 = 50/50 (wt %)
X4: tris(2-acryloxyethyl) isocyanurate/A-5 = 70/30 (wt %)
T5: benzyl acrylate
T6: isobornyl acrylate
T7: triethylene glycol diacrylate
T8: dipentaerythritol hexaacrylate
Y1: 2-ethylhexyl acrylate/n-butyl acrylate = 30/70 (mol %) Mw 20,000
Y2: polybutyl acrylate Mw 50,000

From the results shown in Table 2, the polymerizable composition of the present invention had high sensitivity and high stability. Furthermore, the adhesive comprising the polymerizable composition of the present invention had high adhesive strength.

What is claimed is:

1. An adhesive comprising a polymerizable composition comprising:
   a compound represented by Formula (I);
   a macromolecule having a monomer unit represented by Formula (II) and/or another addition-polymerization type macromolecule; and
   a macromolecular filler comprising a xylene resin, an acrylic rubber, and a polyvinylacetal resin,

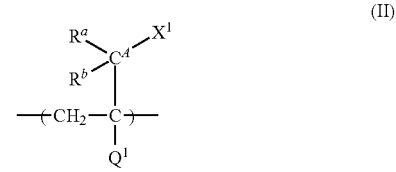

in Formula (I) and (II), $Q^1$ denotes a cyano group or a $-COX^2$ group, $X^1$ denotes a hydrogen atom, organic residue, or polymer chain bonded to carbon atom $C^A$ via a heteroatom, or a halogen atom, $X^2$ denotes a hydrogen atom, organic residue, or polymer chain bonded to the carbonyl group via a heteroatom, or a halogen atom, $R^a$ and $R^b$ independently denote a hydrogen atom, a halogen atom, a cyano group, or an organic residue, and $X^1$ and $X^2$, $R^a$ and $R^b$, and $X^1$ and $R^a$ or $R^b$ may be bonded to each other to form a cyclic structure, wherein the amount of macromolecular filler comprising a xylene resin, an acrylic rubber, and a polyvinylacetal resin relative to 103 parts by weight of the polymerizable composition is 20 to 40 parts by weight.

2. The adhesive comprising a polymerizable composition according to claim 1, wherein the hetero atom of $X^1$ is an oxygen atom or a nitrogen atom.

3. The adhesive comprising a polymerizable composition according to claim 1, wherein $X^1$ is an organic residue or polymer chain having at least one group or bond selected from the group consisting of a hydroxy group, an ether bond, an ester bond, a urethane bond, and an amide bond.

4. The adhesive comprising a polymerizable composition according to claim 1, wherein $Q^1$ is a —$COX^2$ group.

5. The adhesive comprising a polymerizable composition according to claim 1, wherein $X^1$ and/or $X^2$ have a substituent containing an alicyclic structure or an aromatic ring.

6. The adhesive comprising a polymerizable composition according to claim 1, wherein the compound represented by Formula (I) is a compound represented by Formula (I-A):

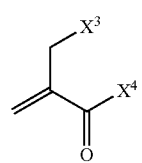
(I-A)

wherein $X^3$ denotes a straight-chain or branched alkoxy group having 1 to 10 carbon atoms, a straight-chain or branched substituted alkoxy group having 1 to 15 carbon atoms, an acyloxy group having 1 to 10 carbon atoms, an aryloxy group having 6 to 12 carbon atoms, a substituted aryloxy group having 6 to 20 carbon atoms, or a substituted amino group, $X^4$ denotes a straight-chain or branched alkoxy group having 1 to 12 carbon atoms, a straight-chain or branched substituted alkoxy group having 1 to 20 carbon atoms, a cycloalkyl group having 3 to 8 carbon atoms, an aryloxy group having 6 to 18 carbon atoms, or a substituted aryloxy group having 6 to 20 carbon atoms, and the substituent in the substituted alkoxy group and substituted aryloxy group is a halogen atom (—F, —Br, —Cl, —I), a, hydroxy group, an alkoxy group having 1 to 6 carbon atoms, an aryloxy group having 6 to 12 carbon atoms, an acyloxy group having 2 to 5 carbon atoms, a cyano group, a straight-chain or branched alkyl group having 1 to 8 carbon atoms, or an aryl group having 6 to 12 carbon atoms.

* * * * *